United States Patent [19]
Coleman et al.

[11] Patent Number: 5,339,108
[45] Date of Patent: Aug. 16, 1994

[54] ORDERING AND FORMATTING CODED IMAGE DATA AND RECONSTRUCTING PARTIAL IMAGES FROM THE DATA

[75] Inventors: Charles H. Coleman, Round Mountain, Nev.; Sidney D. Miller, Mountain View; Peter Smidth, Menlo Park, both of Calif.

[73] Assignee: Ampex Corporation, Redwood City, Calif.

[21] Appl. No.: 896,511

[22] Filed: Jun. 9, 1992

Related U.S. Application Data

[63] Continuation-in-part of Ser. No. 865,315, Apr. 9, 1992, abandoned.

[51] Int. Cl.⁵ .................... H04N 7/133; H04N 5/92
[52] U.S. Cl. .................... 348/408; 358/312; 358/335
[58] Field of Search .......... 358/13, 133, 136, 310, 358/335, 312; H04N 7/133, 5/92

[56] References Cited

U.S. PATENT DOCUMENTS

| | | |
|---|---|---|
| 3,795,763 | 3/1974 | Golding et al. |
| 3,803,348 | 4/1974 | Limb et al. |
| 4,023,199 | 5/1977 | Netravali et al. |
| 4,025,950 | 5/1977 | Matsumoto et al. |
| 4,068,258 | 1/1978 | Bied-Charreton |
| 4,175,270 | 11/1979 | Zenzefilis |
| 4,204,227 | 5/1980 | Gurley |
| 4,302,775 | 11/1981 | Widergren ............... 358/13 |
| 4,383,272 | 5/1983 | Netravali et al. |
| 4,394,774 | 7/1983 | Widergren et al. |
| 4,494,144 | 1/1985 | Brown |
| 4,504,860 | 3/1985 | Nicol et al. |
| 4,541,012 | 9/1985 | Tescher |
| 4,580,134 | 4/1986 | Campbell et al. |
| 4,626,829 | 12/1986 | Hauck |
| 4,654,696 | 3/1987 | Dayton et al. |

(List continued on next page.)

FOREIGN PATENT DOCUMENTS

| | | |
|---|---|---|
| 0448491 | 9/1991 | European Pat. Off. |
| WO9102430 | 2/1991 | PCT Int'l Appl. |

OTHER PUBLICATIONS

Stefhano Tubaro, "A Two Layers Video Coding Scheme for ATM Networks", Signals Processing; Image Communications, vol. 3, No. 2/3, (Jun. 1991), pp. 129–141.

(List continued on next page.)

Primary Examiner—Howard W. Britton
Attorney, Agent, or Firm—John G. Mesaros

[57] ABSTRACT

Editing of information recovered from a relatively high speed communications medium such as a communications channel or magnetic tape often times allows only a portion of the information to be recovered. Storing information in complete segments from which portions of an image, called "snatches," may be recovered helps. An image signal is compressed in such a way that a snatch can be used during decompression to reconstruct a recognizable image from less than all the information that defines the image-thereby giving rise to the notion of a partially reconstructed image. The image information comprises several pixel data blocks with each block including sufficient pixel image data to reconstruct a portion of the image. The pixel data blocks are discrete cosine transformed ("dct") to generate a set of dct coefficient blocks. The dct coefficients for a group of dct coefficient blocks are rank ordered from highest visibility coefficient (corresponding to lowest dct frequency coefficient) to lowest visibility coefficient (corresponding to highest dct frequency coefficient), and then are quantized, entropy encoded, and formatted together with synchronization information and parity checks from the error correction encoding before being transmitted on a channel or recorded on magnetic tape. A decompression and reconstruction arrangement functions essentially as the inverse of the compression arrangement. It is during the decompression that snatches are retrieved and used to reconstruct a partial (video) image by using some but not necessarily all the dct coefficients that define the image.

36 Claims, 6 Drawing Sheets

U.S. PATENT DOCUMENTS

| | | |
|---|---|---|
| 4,672,467 | 6/1987 | Heitmann . |
| 4,679,094 | 7/1987 | Rutherford et al. . |
| 4,682,248 | 7/1987 | Schwartz . |
| 4,698,694 | 10/1987 | Tomita et al. . |
| 4,740,832 | 4/1988 | Sprague et al. . |
| 4,743,960 | 5/1988 | Duvic et al. . |
| 4,758,881 | 7/1988 | Laspada . |
| 4,764,805 | 8/1988 | Rabbani et al. . |
| 4,768,082 | 8/1988 | Hiratsuka et al. . |
| 4,774,562 | 9/1988 | Chen et al. . |
| 4,775,897 | 10/1988 | Umemoto et al. . |
| 4,783,841 | 11/1988 | Crayson . |
| 4,797,741 | 1/1989 | Sato et al. . |
| 4,802,003 | 1/1989 | Takei et al. . |
| 4,821,119 | 4/1989 | Gharavi ............... 358/133 |
| 4,847,677 | 7/1989 | Music et al. . |
| 4,849,807 | 7/1989 | Music et al. . |
| 4,857,991 | 8/1989 | Music et al. . |
| 4,862,167 | 8/1989 | Copeland, III . |
| 4,868,653 | 9/1989 | Golin et al. . |
| 4,974,078 | 11/1990 | Tsai . |
| 5,001,561 | 3/1991 | Haskell et al. . |
| 5,006,931 | 4/1991 | Shirota ............... 358/133 |
| 5,136,391 | 8/1992 | Minami ............... 358/310 |
| 5,196,933 | 3/1993 | Henot ............... 358/136 |
| 5,231,487 | 7/1993 | Hurley ............... 358/310 |
| 5,239,308 | 8/1993 | Keesen ............... 341/67 |

OTHER PUBLICATIONS

C. Yamamitsu et al., "A Study On Trick Plays For Digital VCR", IEEE 1991 International Conference on Consumer Electronics, Digest of Technical Papers, (Jun. 1991), pp. 184–185.

Herbert Lohscheller, "A Subjectively Adapted Image Communication System", IEEE Transactions on Communications, COM. 32, No. 12, (Dec. 1984), New York, pp. 1316–1322.

Chen et al., "Scene Adaptive Coder", IEEE Transactions on Communications, vol. COM-32, Mar. 1984, pp. 225–232.

Yamamitsu et al., "An Experimental Digital VTR Capable of 12-Hours Recording", IEEE Transactions on Consumer Electronics, vol. CE-33, No. 3, Aug. 1987, pp. 240–248.

Yamamitsu et al., "A Study on Trick Plays for Digital VCR", IEEE Transactions on Consumer Electronics, vol. 37, No. 3, Aug. 1991, pp. 261–266.

Onishi et al., "An Experimental Home-Use Digital VCR with Three Dimensional DCT and Superimposed Error Correction Coding", IEEE Transactions on Consumer Electronics, vol. 37, No. 3, Aug. 1991, pp. 252–260.

Yeneda et al., "An Experimental Digital VCR with New DCT-Based Bit-Rate Reduction System", IEEE Transactions on Consumer Electronics, vol. 37, No. 3, Aug. 1991, pp. 275–282.

Yamamitsu et al., "An Experimental Study for a Home-Use Digital VTR", IEEE Transactions on Consumer Electronics vol. 35, No. 3, Aug. 1989, pp. 450–457.

Yoneda et al., "An Experimental Digital VCR with New DCT-Based Bit-Rate Reduction System", IEEE Transactions on Consumer Electronics, vol. 37, No. 3, Aug. 1991, pp. 275–282.

Kim et al., "Bit Rate Reduction Algorithm for a Digital VCR", IEEE Transactions on Consumer Electronics, vol. 37, No. 3, Aug. 1991, pp. 267–274.

Ahmed et al., "Discrete Cosine Transform", IEEE Transactions on Computers, vol. C-23, No. 1, Jan. 1974, pp. 90–93.

ORDERING AND FORMATTING CODED IMAGE DATA AND RECONSTRUCTING PARTIAL IMAGES FROM THE DATA

CROSS REFERENCE TO RELATED APPLICATION

This application is a continuation-in-part of copending patent application Ser. No. 07/865,315 filed Apr. 9, 1992, abandoned.

BACKGROUND OF THE INVENTION

1. Field of the Invention

This invention relates to the compression and decompression of signals and, more particularly, to ordering and formatting digital information signals while compressing the digital signals, for example, so that, when transmitted over a communications channel or when recorded on a recording medium, the compressed signals can be transmitted or stored in whatever space is allotted for them and so that the signals can be decompressed in such a manner that information can be reconstructed from complete or incomplete segments of the decompressed signals. Here, the information signals are illustratively disclosed in terms of being digital data image signals.

2. Description of Related Art

Reasons for compressing signals such as signals representing images include (a) being able to send a minimal amount of data from one point to another point by way of a communications channel or (b) being able to record a minimal amount of data on a storage medium. One way to achieve the goal of compressing signals is to eliminate the transmission of unnecessary or redundant data. For example, images like digital video images, by their very nature, contain a great deal of redundancy and thus are good candidates for data compression. By removing a portion of the redundancy from a digital image signal at a transmitter, the amount of data either (a) transmitted over a communications channel or (b) recorded on a storage medium may be substantially reduced. The image may then be reconstructed by reintroducing the redundancy (a), if transmitted, at a receiver or (b), if recorded, in the recorder playback electronics.

Data compression for use in conjunction with digital video tape recorders has several unique requirements which impose additional and unusual constraints on any compression methodology used. The unusual constraints generally arise from the typical modes of use of a video tape recorder and from the fact that image data is typically stored on a recording medium like magnetic tape for later use as opposed, for example, to being immediately transmitted to a home viewer. (The term or expression "image data" as used herein refers to data or information defining an image to be displayed.) It is a common requirement in the television industry that a video tape recorder be structured so as to allow editing of the recorded information. Practically, this usually means that the stored data for one field of a two field television frame either occupy an integer number of tracks on the tape or occupy defined image blocks of video data at predictable locations or tracks on the tape. This imposes as a constraint that a field of data or an image block of data be constant in length. Such a seemingly simple constraint places a severe design requirement on any compression scheme because most images statistically have nonuniform probability density functions. One design solution to a digital signal having varying information content would be to allow the encoded data rate to temporally vary on a frame-by-frame or field-by-field basis according to the image content. However, because of editing requirements, the encoded data rate is typically fixed at the upper bound of the channel data rate rather than being allowed to vary.

Various digital video compression studies have recently focused on the two-dimensional discrete cosine transform ("dct") for use as a preferred adaptive coding vehicle due to its energy compaction properties and due to the relative ease with which the dct can be implemented using digital circuits. See, for example, the article by N. Ahmed et al. entitled "Discrete Cosine Transform," *IEEE Transaction on Computers*, Vol. C-23, No. 1 (January 1974), pp. 90-93. To perform a transformation on a video image, the image is first divided into image blocks of pixels (for example, each block being a square array having, in one case, 16 rows $\times$ 16 columns of pixels or, in another case, 8 rows $\times$ 8 columns of pixels), and then cosine transformed into a set of transform coefficients. (The word "pixel" is a shortened form of the expression "picture element.") In the cosine transformed domain, the larger amplitude coefficients are generally concentrated at the lower frequency components—meaning that the lower frequency components including the zero frequency, or direct current ("dc"), component tend to have the larger amplitude coefficients while many of the higher frequencies tend to have amplitude coefficients of zero or nearly zero values.

Compression can be achieved by scaling, or quantizing, the values of the dct coefficients and then encoding the quantized dct coefficients using an entropy coder such as a Huffman coder. A key factor in making this scheme work effectively is the quantizing process. If the quantization is too fine, the data generated by a Huffman coder will exceed the data rate of the channel (or of the recorder, as the case may be), while if the quantization is too coarse the quantization results in unacceptable distortion or noise. One technique for determining a suitable quantization parameter is one that monitors an output buffer memory and uses a feedback scheme for adjusting the quantization level to maintain an equilibrium of data in the buffer. See, for example, the method described in the article by W-H Chen and W. K. Pratt, "Scene Adaptive Coder," *IEEE Transactions on Communications*, Vol. Com-32, No. 3 (March 1984), pp 225-232. See also, for example, U.S. Pat. No. 4,302,775. Further, bit allocation methods as utilized in the past do not produce the image quality that is desired if there is a relatively wide range of different kinds of images defined by the data to be compressed. For a dct solution to this problem, see copending patent application Ser. No. 08/106,968 filed Aug. 16, 1993 which is a continuation of Ser. No. 07/654,710 filed Feb. 13, 1991 by Peter Smidth et al. and entitled "Method and Apparatus for Shuffling and Decompressing Data" and assigned to the assignee of this application.

As suggested earlier, an editing feature in a recorder places additional constraints on a data compression methodology. For example, in an edit mode, recorded information is replaced, typically by being overwritten with new information during the course of an edit. That constraint requires that the smallest unit of information that is to be replaced be allotted a fixed space in the recorded data format. For example, when dealing with television signals, the smallest unit of information that is to be replaced would typically be a single field. Allotting a fixed space for a single field is equivalent to allowing any unit of a video signal to be replaced with any equal sized unit of the same video signal or with any equal sized unit of a different video signal. To maintain maximum efficiency in recording and to minimize gaps for record over-runs, it is desirable to use a recording format which has a fixed short period relative to the original uncompressed information. This simplifies the design of a data de-formatter by providing a regular and an expected structure to the data stream received from the communications channel or recovered from storage medium tape. This regular structure allows "intelligent" de-formatting of the image data because certain patterns may be identified as errors and ignored.

Editing also involves relatively high transport speeds. For example, the needs of the television broadcast industry usually demand that video tape recorders allow images to be reproduced at higher than normal record/-playback tape transport speeds, which is sometimes referred to in the industry as a picture-in-shuttle mode. It is not uncommon that a picture-in-shuttle mode operate at sixty (60) times the normal playback speed. As a result of the exceedingly high picture-in-shuttle playback speeds, only a fraction, or a portion, of the data recorded on a track is generally recovered. This fact requires that the compressed data which is recorded on the tape be stored in small, yet complete, segments of information from which a portion or portions of the picture may be recovered. The portion that is recovered is sometimes called a "snatch" in the industry. The term "snatch" reflects the fact that, in an attempt to quickly recover all of the information that defines an image to be displayed, the practical result is that some, but not necessarily all, of the information which defines the image is recovered.

One problem then is to order and to format the image data that is being transmitted or that is to be stored on the recording medium in such a manner that the information represented by a snatch can be used to reconstruct a partial, yet recognizable, image from less than all the digital information that defines the image to be displayed. It is further desirable that the reconstruction of the partial image be done in a timely manner and in a manner that permits efficient editing of the information transmitted over a channel or stored on a recording medium, especially in a picture-in-shuttle mode.

SUMMARY OF THE INVENTION

These and other problems are solved in accordance with the principles of the present invention, which relates to data compression that includes ordering and formatting image data so that the information represented by a snatch can be used during data decompression to reconstruct a partial, yet recognizable, image from less than all the digital information that defines the image to be displayed.

During compression, the image signal is received and stratified into a plurality of image blocks, each image block (a) being of predetermined size and (b) including image data from the image signal that defines a respective portion of the image signal. Each image block is transformed, here in our illustrative embodiment using the discrete cosine transform ("dct"), to obtain respective transform coefficient blocks. The dct coefficients within the transform coefficient blocks are visibility ordered, in our illustrative embodiment from lowest dct frequency (which is typically a direct current ("dc") or zero frequency) to highest dct frequency. The visibility ordered blocks of image transform coefficients are provided to a communications medium, in our illustrative embodiment to a transmission link or to a recording medium, as segments of predetermined size.

During decompression, snatches of dct transform coefficients are retrieved from the communications medium. Each snatch includes one or more rank ordered groups of transform coefficients where a rank ordered group includes a plurality of similarly significant transform coefficients. A snatch may correspond to a plurality of image blocks which are usable to reconstruct a portion of the image. For example, one snatch may correspond to the image blocks representing the upper left corner of the image while another snatch may correspond to the image blocks representing the lower left corner of the image while still another snatch may correspond to the image blocks representing the middle right portion of the image et cetera.

In one example, assume that the direct current (dc) transform coefficient has a higher visibility measure than does the ninth coefficient. Then one ordered group could contain a Y(0) luminance dct transform coefficient for each of a plurality of transform blocks that comprise a data set while a next succeeding ordered group could contain a Y(9) luminance dct transform coefficient for each of the plurality of transform blocks that comprise the data set, et cetera.

As an aside, it might be mentioned that it is preferred that, at least some, direct current, or zero frequency, dct transform coefficients be retrieved in a snatch; otherwise, a partially reconstructed image may not be acceptable due to an untimely dc offset which could result is serious clipping of the non-dc dct transform coefficients.

Continuing, the partial dct transform coefficient blocks from a snatch can then be inversely transformed to obtain a corresponding plurality of image blocks. Since a snatch including one or more transform coefficient blocks can be retrieved, the corresponding one or more image blocks may represent only a portion of the image and not the entire image. In this connection, it is worth mentioning that there are two kinds of partial retrievals. One kind of partial retrieval is exemplified by retrieving some but not all the dct transform coefficients which define a single image block. The other kind of partial retrieval is exemplified by retrieving one or more blocks for some areas of the image but not all the blocks for all the areas of the image. In either case there is a partial retrieval and hence there can be only a partial reconstruction of the image.

In view of the above, if not all the transform coefficients of a transform coefficient block have been retrieved, then not all the information needed to completely reconstruct the pixels of an image block may be available to reconstruct the image. Rather a partially reconstructed image is obtained. Generally, a group of visibility ordered dct coefficients are retrieved for reconstructing several image blocks. The fewer number of retrieved dct coefficients would typically mean that, while the complete area of the image may be reconstructed, a reduced sharpness in picture quality may result on the reconstruction because a lesser number of spatial frequency terms have been retrieved. As a result, a partial image will be displayed, which may however be adequate, for example, for editing purposes. Further, the partially reconstructed image corresponding to the retrieved snatch may not be as sharp and clear as the original image but, in accord with the principles of our invention, it will generally be sharp enough and clear enough to permit an editing operator to determine a location in the communication medium where the information defining the complete image is located.

BRIEF DESCRIPTION OF THE DRAWING

For a better understanding of the invention as well as other objects and further features thereof, reference is made in the following detailed description which is to be read in conjunction with the accompanying drawing wherein.

DETAILED DESCRIPTION

Figure 1:
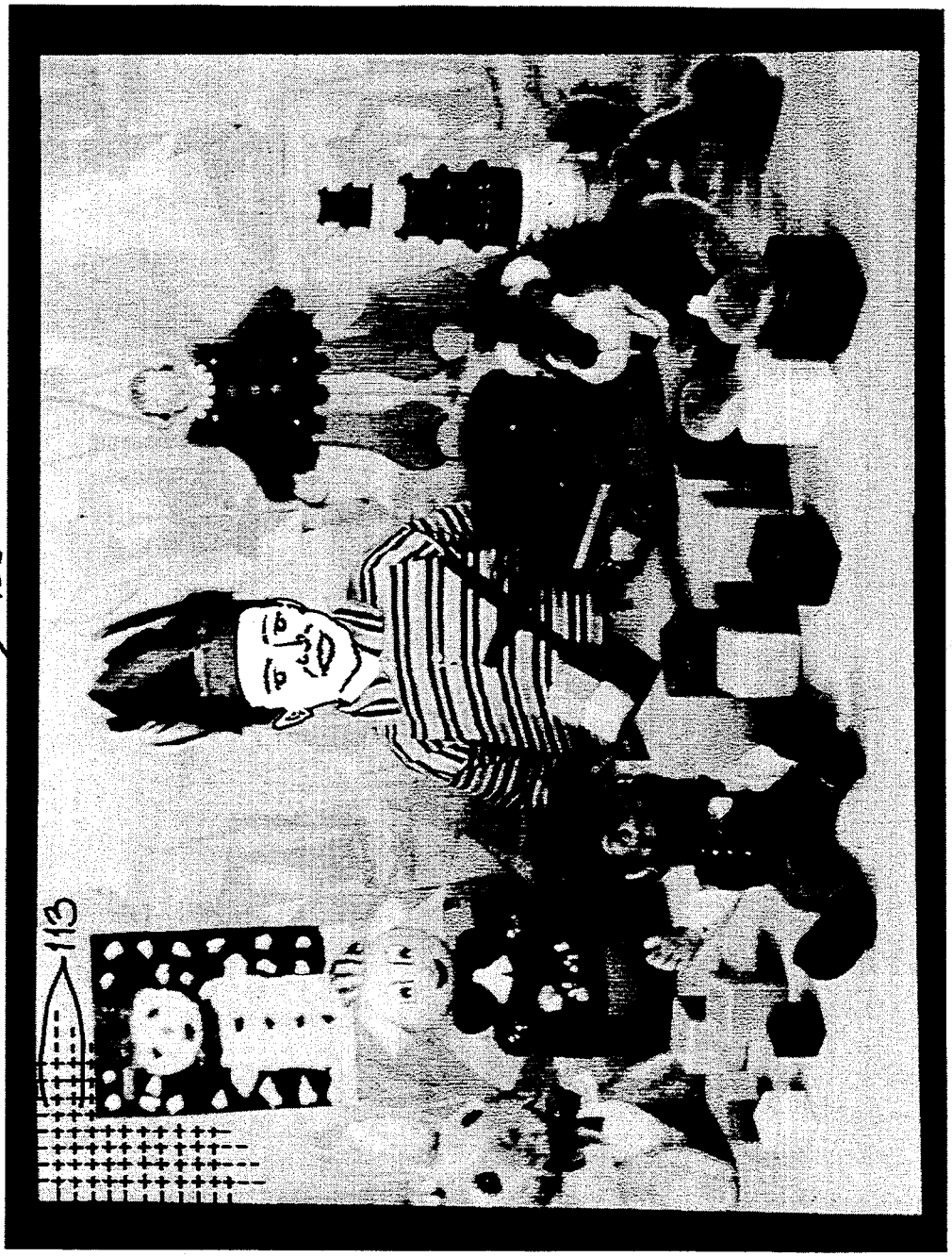
FIG. 1 is a view of a video image, depicting the manner in which a video image can be stratified into a plurality of image blocks, each image block for defining a portion of the video image.

FIG. 1 depicts a television image 100. In the upper left corner portion of television, or video, image or picture 100 there is shown what is herein referred to as an image block 113. It is understood that the entire video image 100 can be electronically stratified into a plurality of image blocks, which need not actually be visible but which are shown as, for example, image block 113 for purposes of being useful in describing an illustrative embodiment of the principles of our invention. Each of the plurality of image blocks 113 includes sufficient image data to construct and to reconstruct, and accordingly to define, a corresponding portion of the image being displayed at a corresponding spatial location of the television image 100. Each image block comprises image data for a predetermined number of pixels, which form a sub-picture, or portion, of the image being displayed or to be displayed.

In an illustrative embodiment, the video image 100 comprises the CCIR-601 component color television standard and, therefore, the video image is defined by three components, which comprise a color video signal under the CCIR-601 component color television standard; namely, a luminance component (Y) and two complementary chrominance components (R-Y) and (B-Y). Each component has its own image block. In one example, a luminance (Y) image block may comprise four pixel rows and eight pixel columns and is sometimes herein referred to as a 4×8 pixel array or sub-array or image block, while a chrominance image block may comprise four pixel rows and four pixel columns, and is sometimes herein referred to as a 4×4 pixel array or sub-array or image block. If the image 100 were displayed in color, there would be image blocks 113 for each of the chrominance components (R-Y) and (B-Y) that contain color information as well as an image block 113 for the luminance (Y) component.

Consistent with a chosen transformation and a chosen coding scheme, the size of an image block is selected to be truly representative of the video image. For example, the size of an image block is selected (a) so as not to be so large that the data in the majority of image blocks, which comprise a television image, is not correlated and (b) further so as not to be so small that there exists strong correlation between a large fraction of adjacent image blocks and (c) still further so as to approximately equalize the correlation in the two directions of an image block. With that as a guideline in the illustrative embodiment being described, the image blocks of luminance video data component (Y) are selected for illustration purposes only and not by way of limitation as having a predetermined size of four pixels vertically (there being four rows of pixels in each column of pixels) and eight pixels horizontally (there being eight columns of pixels in each row of pixels), i.e. as a 4×8 image block, while the image blocks of each of the chrominance video data components (R-Y) and (B-Y) are selected as having a predetermined size of four pixels vertically and four pixels horizontally, also known as a 4×4 image block.

As an aside, note that there are two fields in a television frame. Therefore, a 4×8 image block of pixels for each of the two interlaced fields that comprise the television frame will result in an equivalent 8×8 image of the frame. As another aside, note that the two fields are compressed separately because there could be motion between the two fields of a frame which would reduce the correlation between the adjacent lines of the frame, i.e. between the two fields of the frame. As a still further aside, note that the chrominance video data components are sampled at one-half the rate horizontally viz-a-viz the rate at which the luminance component is sampled. Therefore, a 4×4 image block for each of the two chrominance components will cover the same spatial area of the video image as a 4×8 image block of the luminance component.

Continuing, although the image block size of each component can be different, the following description is in terms of a luminance video data component (Y) image block size of four pixel rows and eight pixel columns and in terms of the chrominance video data components (R-Y) and (B-Y) having image block sizes of four pixels vertically and four pixels horizontally while recognizing that such a description is by way of illustration only, and not by way of limitation, since one skilled in the art can readily apply the principles set forth in this detailed description to a video image signal having other components or other predetermined sizes for the image blocks.

To better understand the principles of our invention, the description will now broadly focus on some of the bilateral symmetries related to the compression and the decompression aspects of those principles.

Figure 2:
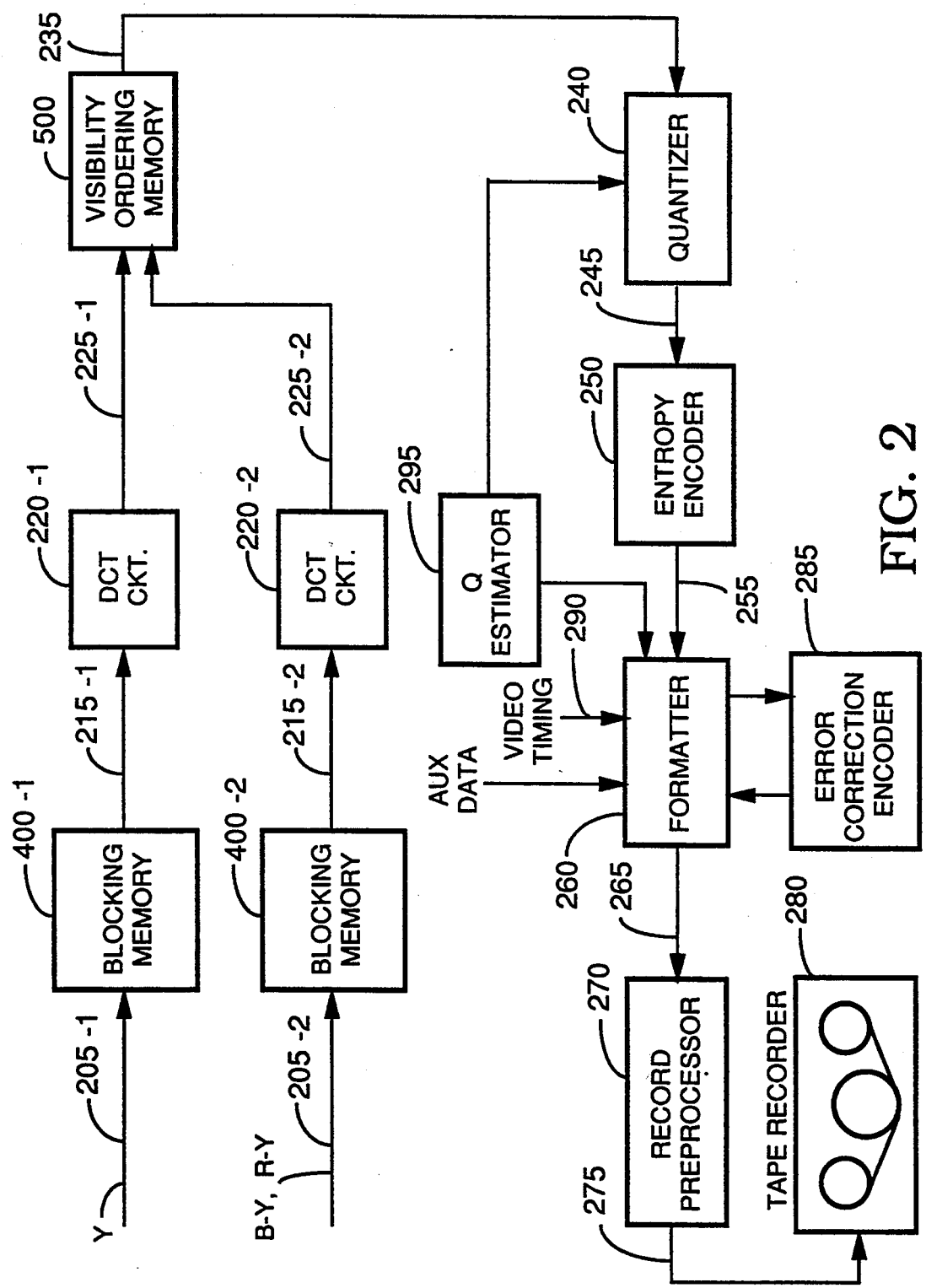
FIG. 2 is a block diagram of a compression arrangement for ordering and formatting information according to the principles of our invention.

Refer now to FIG. 2 as an aid in the description of the compression of image signal information. There is illustrated in block diagram form a compression arrangement for ordering and formatting information so that the ordered and formatted information is arranged (a) for transmitting the information over a communications channel or (b), as is here more particularly illustrated, for recording the information on a recording medium, either function being according to the principles of our invention.

Luminance video data component (Y) of video image 100 is provided over cable 205-1 to an input of blocking memory 400-1 in raster scan order television fields on a line-by-line format while the chrominance video data components (R-Y) and (B-Y) can be alternately provided over cable 205-2 to an input of blocking memory 400-2. Blocking memories 400-1 and 400-2 can be substantially identical and accordingly the details of blocking memories 400-1 and 400-2 are hereinafter described in terms of the illustrative blocking memory 400, which is hereinafter described in relation to FIG. 4.

The respective blocking memories 400-1 or 400-2 include, among other things, line-to-block converter stores (a) to convert or stratify raster scan order television fields of the digital image data on a line-by-line basis to raster scan order image-block-by-image-block digital image data and (b) to provide a line-to-block converted representation of image blocks over a respective cable 215-1 or 215-2 to a respective discrete cosine transform (dct) circuit 220-1 or 220-2, which provides the respective luminance and chrominance dct coefficients of a group of transformed image blocks (versus the dct coefficients of a single transformed image block). As an aside, the rather complex operation that is provided by the blocking memory 400 will be made more clear later on. Continuing, dct circuits 220-1 and 220-2, which can be embodied, for example, with a Model STV 3200 discrete cosine transform circuit supplied by Thomson CSF, provide the dct coefficients for the respective transformed image blocks over a respective cable 225-1 or 225-2 to visibility ordering memory 500 where the luminance and chrominance dct coefficients Y and $C_h$) of a group of transformed image blocks (versus the dct coefficients of a single transformed image block) are multiplexed together and then rank ordered from highest visibility coefficient (corresponding to lowest dct frequency coefficient) to lowest visibility coefficient (corresponding to highest dct frequency coefficient). It is perhaps worth mentioning now, and it will be made more clear later on, that, except for the input blocks being provided to dct circuits 220-1 and 220-2 in a row-wise manner and except for the output blocks being provided from dct circuits 220-1 and 220-2 in a column-wise manner, dct circuits 220-1 and 220-2 produce a set of output dct frequency coefficients that are grouped into two-dimensional blocks of the same size as their respective input blocks.

As an aside, the group of image blocks which is dct transformed during a single pass through a dct circuit is referred to herein as a "data set." The number of image blocks that comprise a data set is a design parameter, which we assume to be fifteen (15) in our illustrative embodiment, i.e. 15 image blocks comprise a data set. The number 15 is chosen for purposes of illustration only and is not a limitation on our invention. Further, there is a data set for the luminance video data component (Y) of video image 100 and a data set for each of the two chrominance video data components (R-Y) and (B-Y). The three data sets, i.e. one for the Y component, one for the R-Y component and one for the B-Y component, when combined as later described by a multiplexer 520 at the front end of visibility ordering memory 500 shown in FIG. 5, form what we call a "color component data set." These concepts of a data set and a color component data set will be further clarified a little later on in this description but for the moment suffice it to say that, on the one hand, 15 luminance component image blocks {each of which includes a 4×8 luminance pixel sub-array} comprise a luminance (Y) data set while 15 (B-Y) chrominance component image blocks {each of which includes a 4×4 (B-Y) chrominance pixel sub-array} comprise a chrominance (B-Y) data set while 15 (R-Y) chrominance component image blocks {each of which includes a 4×4 (R-Y) chrominance pixel sub-array} comprise a chrominance (R-Y) data set whereas, on the other hand, the combination of a luminance (Y) data set and a chrominance (B-Y) data set and a chrominance (R-Y) data set comprise a color component data set.

Also, the dct coefficients of a data set are, in accordance with the principles of our invention, ranked in the order of descending importance relative to some measure, which measure corresponds to the quality of the reconstruction of an image as perceived, for example, by a human eye. Such a rank ordering of the components of a transformed data set can be thought of as an ordering that corresponds to a defined measure of what we call "visibility." It ought to be mentioned that the word "visibility" is not to be understood to limit the scope of the principles of our invention to that which is only "visible" to the human eye but rather is a helpful word to describe an illustrative embodiment of the principles of our invention. One example of ordering by visibility can include a rank ordering of transformed dct coefficients from a measure defining a highest "visibility" to a measure defining a lowest "visibility." The ordering of the data is from most visible to least visible. That is, the dct coefficients which contribute the most to recognizability of the reconstructed image occur earliest in the ordering, and those which contribute the least are later in the ordering. Visibility, in this context, is then understood to be a measure of the relative importance of the particular dct basis function in providing an image, which is recognizable to a human observer. The visibility ordering may, but need not, correspond exactly to an ordering from lowest dct frequency coefficient (the lower dct frequency coefficients have the higher visibility measure) to highest dct frequency coefficient (the higher dct frequency coefficients have the lower visibility measure). There could be a problem in defining frequency here since we are dealing in two dimensional spatial frequency. For example, what does one do to define precedence of horizontal over vertical versus diagonal? In any event, it should be noted that the visibility ordering may differ slightly from a frequency ordering. Why? For the foregoing reasons as well as because it has been determined experimentally that the human eye is more sensitive to horizontal and vertical contours than it is to diagonal contours. Also, in naturally occurring scenes, little of the image consists of diagonal energy. The fact that little energy resides in the diagonals is used to allow transmission of color information in the NTSC standard for color image encoding. In view of the above and for ease of illustration and to avoid confusion about the dct coefficients being rank ordered from lowest dct frequency coefficient to highest dct frequency coefficient, the ensuing description will be in terms of a "visibility ordering" of the transform coefficients. It should be again noted that the coefficients could, but need not, be ordered by frequency or still ordered according to any of several other measures. Since orderings other than by frequency are possible in accordance with the principles of our invention, we use the phrase "visibility ordering" to embrace the concepts of descending order of importance where the word "importance" corresponds to a measure such as a frequency measure or such as any other measure of contribution to a clearer and more aesthetically pleasing reconstructed image or for that matter to any of several other possible measures, any and all of which are herein referred to by the term "visibility measure."

Continuing, the lowest dct coefficient, which can also be viewed as the highest visibility measure, can be likened unto a direct current ("dc") coefficient having zero frequency. Here, it will be recalled that, in the cosine transform domain, the larger amplitude dct coefficients are generally concentrated at the lower frequencies, or more correctly within the framework of this description, at the higher visibility components, meaning that the lower visibility components tend to have the smaller amplitude coefficients whereas the higher visibility components (which correspond to the lower frequencies) have the higher amplitude coefficients. Here, it can also be mentioned that it is preferred that, at least some, dc transform components be retrieved in a snatch; otherwise, a partially reconstructed image may not be acceptable due to an untimely dc offset which could result is serious clipping of the non-dc transform coefficients.

For discussions purposes, assume that respective dct circuit 220-1 or 220-2 provides an integer number "r" of discrete cosine transform coefficients. As will later become more clear, in view of the above, it is possible to partially reconstruct a video image from some subset of the dct coefficients, i.e., from less than all the dct coefficients by using some integer number "s" of the dct coefficients where "s" is less than "r." As an aside, we use the term "partially" in the sense that not all the detail of the original image is reconstructed using the subset of dct coefficients and not in the sense that the area of the picture image is changed. Continuing, of course, the quality of the video image when reconstructed using some subset (say using "s") of the dct coefficients rather than the full complement of "r" dct coefficients will in all likelihood be degraded in the sense that some detail or some sharpness of the picture may be lost. Notwithstanding, for some uses such as when attempting to locate a particular scene while editing in the unusually high speed picture-in-shuttle mode the image that is reconstructed using the lesser number of "s" dct coefficients may, for those kind of uses, possess a tolerable and aesthetically satisfactory image picture quality even though its detail or sharpness may be degraded.

Consistent with the foregoing description, the dct coefficients of a data set are rank ordered by visibility measure and are then provided over cable 235 to quantizer 240 where the visibility ordered dct coefficients of the color component data set are normalized by a quantization factor Q. Quantization factor Q is supplied by quantization estimator 295 (a) so as not to be so small that the output of entropy encoder 250 supplies too much data for insertion in a predetermined fixed size format (meaning that some information overflows and is lost which would lead to an impairment of reconstructed picture quality) and (b) so as not to be so large that the output of entropy encoder 250 supplies too little data for insertion in a predetermined fixed size format (meaning that the format could have accepted more data to better define the video image which would also lead to an impairment of reconstructed picture quality). The normalized values are extended from quantizer 240 over cable 245 to an entropy encoder (for example, to a Huffman coder) 250. The entropy encoded dct coefficients, again in visibility order, are provided over cable 255 and combined with the quantization factor Q and any miscellaneous auxiliary data AUX DATA (for example, auxiliary data representing digital audio signals or embedded time codes) by formatter 260, which, also, in response to video timing signals on cable 290, inserts synchronizing information along with error correction information from error correction encoder 285 to generate a formatted image data signal. The thusly formatted error correction encoded (ECC) image data signal is extended from formatter 260 over cable 265 for preprocessing by record preprocessor 270. Thereafter, the then preprocessed image block data is provided as a predetermined segment length of information over cable 275 to a communications channel for extension to a receiver or, as is here illustrated, to a video signal recorder 280 for recording on a record medium like magnetic tape.

In that manner, the compression arrangement of FIG. 2 performs the following functions: (a) dct transforms a television image comprised of a plurality of image data sets, each data set comprised of a plurality of image blocks, each image block being of predetermined image block size, (b) visibility rank orders the transformed image data set, (c) normalizes the visibility ordered coefficients of the data set; (d) encodes the transformed, normalized image data, which results in compression of the image data; (e) provides synchronization information for recovery of the compressed data; (f) formats the synchronized image data; and (g) either transmits over a channel or records on a recording medium the formatted image data in segments of predetermined size.

Reference is also made to Appendix A, which is C programming language program that further describes several aspects the compression arrangement of FIG. 2.

Figure 3:
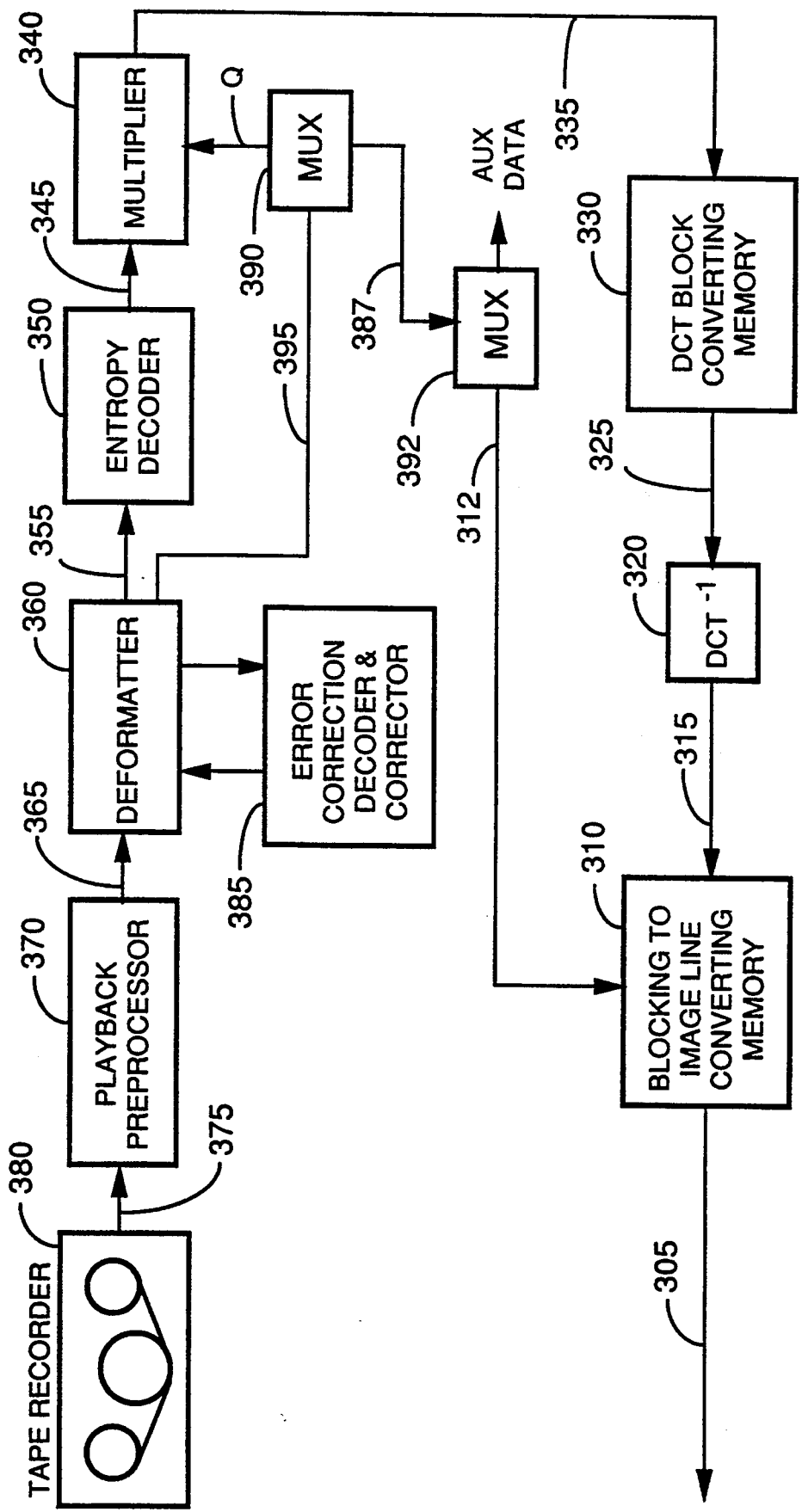
FIG. 3 is a block diagram of a decompression arrangement for reading the ordered and formatted information and for reconstructing an image or a portion of an image according to the principles of our invention.

Refer now to FIG. 3 for a decompression and reconstruction arrangement for performing functions which are essentially the inverse of the functions performed by the structure of FIG. 2. There is illustrated in block diagram form a decompression arrangement for reading the visibility ordered and formatted information, which is received as predetermined segment lengths of information either (a) from a communications channel or (b), as is here more particularly illustrated, from a recording medium, either function being according to the principles of our invention. Keeping in mind that the image blocks of each of the chrominance video data components (R-Y) and (B-Y) can be similarly processed by equivalent apparatus as is shown in FIG. 2, the compressed and ordered and formatted image block data of both the luminance video data component (Y) and the chrominance video data components (R-Y) and (B-Y) of video image 100, having been transmitted or recorded as above noted in connection with FIG. 2, are provided as predetermined segment lengths of information (a) from a communications channel for extension to a receiver or (b), as is here illustrated, from a video signal playback device 380 over cable 375 to a playback processor 370, which converts the information to a serial data stream that represents the compressed and ordered and formatted and ECC encoded image block data. The serial data stream is provided over cable 365 to de-formatter 360 and error correction decoder and corrector 385 where it is de-formatted and error corrected to generate a plurality of code words. The code words of the thusly de-formatted data set comprised of a plurality of image blocks are then extended over cable 355 to entropy decoder 350 where the code words are decoded to produce normalized, visibility ordered coefficients. The coefficients are provided over cable 345 to multiplier 340 where they are multiplied by a quantizing factor Q, which was used as a normalization factor during the compression process. Quantizing factor Q is provided by multiplexer 390 in response to de-formatter 360 extending AUX DATA and quantizing factor Q values over cable 395 to multiplexer 390. An output of multiplier 340 is the set of quantized coefficients, again in visibility order, which is provided over cable 335 to dct image block converting memory 330 where it is converted into a set of dct coefficient image blocks that are provided over cable 325 to inverse dct circuit 320. There the dct coefficients are inversely transformed to raster scan order image block digital image data by inverse dct circuit 320. The inversely transformed coefficients are provided by inverse dct circuit 320 over cable 315 to be processed by a second blocking memory 310, which includes, among other things, a block-to-line converter store to convert raster scan order image block digital image data to raster scan order television-field-by-television-field digital image data that is provided over cable 305 as a video data component of video image 100.

We now turn to a bit more specific detail and first describe playback at normal speeds, where the data recovered from magnetic tape are complete, and there are no incompletely recovered frequency ordered data sets.

The recorded data are received, upon playback, from the playback preprocessor 370, and extended over cable 365 to the deformatter 360. The deformatter extracts synchronizing information from the formatted data stream, computes the error correction syndromes, which are sent to the error correction decoder 385. The error correction decoder returns locations of errors and corrections to the deformatter, which applies these corrections to the data before they are extended over cable 355 to the entropy decoder 350. The deformatter also separates the quantifier value Q from the data stream, and after an appropriate delay period, outputs the value over cable 395 to the multiplexer 390. Additionally, the deformatter separates the set identifier (610 of FIG. 6) from each formatted group of frequency ordered coefficients and extends it over cable 395 to multiplexer 390 where it is sent to the output 387 of the multiplexer where it is extended to the second multiplexer 392 and extended over cable 312 to the blocking to image line converting memory 310.

Auxiliary data are such as, for example, audio are selected by the multiplexer 392 and directed to the AUX DATA output, where they are available for further processing by other circuit elements which are not shown explicitly.

The entropy decoder decodes the entropy coded quantized coefficient values and supplies them over cable 345 to the multiplier 340. The multiplier 340 multiplies each quantized coefficient, of a predetermined group of coefficients, by a value which is a function of Q and the index of the coefficient, to form a stream of normalized coefficients which are extended over cable 335 to the dct block converting memory 330.

The dct block converting memory reorders each group of frequency ordered coefficients into groups of dct coefficient blocks. The dct coefficient blocks are read out of the block converting memory in raster scan order by column and the data stream formed by the sequence of coefficients is extended over cable 325 to the inverse dct calculator 320, where each block of dct coefficients are inverse transformed to produce a block of pixels which are in raster scan order by row. The sequence of pixels formed by the inverse dct calculator are extended over cable 315 to the blocking to image line converting memory 310. The blocking to image line converting memory reads blocks of pixels at its input as supplied over cable 315 from the inverse dct calculator, into locations determined by the identifier supplied over cable 312 and a pixel counter internal to the blocking to image line converting memory, and supplies image pixels in raster scan by line order at it's output over cable 305. Typically, the raster scan by line image supplied by cable 305 is directed to a frame storage memory or a real-time display device.

In the picture-in-shuttle mode, when the tape is played back at higher than normal playback speed, data recovered by the playback processor 370 from the tape recorder 380 is incomplete. That is, the recovered data stream consists of snatches of correct data interleaved with noisy incorrect data which occurs when the playback heads are between recorded data tracks on tape. It is then the object of the playback system to separate the snatches of valid data from the invalid data, and create a partial image by decoding the snatches of valid data.

In order to separate the valid data from the invalid data, a method of determining which data is valid and which is not is needed. There are many methods known in the art, which are more or less reliable in this regard. There is a compromise between amount of valid data recovered and degree of certainty that the data assumed to be valid in fact is valid. For example, it is known that when a playback head moves away from the center of a recorded track, the amplitude of the playback waveform decreases. If data received with less than a predetermined amplitude of playback waveform is considered invalid, than depending on the value of threshold, the reliability of this method for supplying only valid data varies. More complex methods combining several measures including playback waveform, error rate as measured by the number of corrections made by the error correction decoder, etc. may be combined to provide a suitably reliable method of selecting valid data for reconstruction.

The following remarks are made assuming that valid snatches of data are identified in the deformatter, and that invalid data are set to zero.

There are two cases for invalid data recovered from tape: in the case where the invalid data span a substantial number of the high visibility terms of visibility ordered data set, especially the dc terms, or the identifier is corrupted, it is not possible to reconstruct a recognizable image from what remains. In the other case, where invalid data occur in the low visibility terms, it is possible and desirable to reconstruct the image which corresponds to the recovered data.

When a reconstructable visibility ordered data set is recovered from the transmission medium, the entropy decoder decodes the entropy coded quantized coefficient values and supplies them over cable 345 to the multiplier 340. Invalid data are set to zero or flagged as invalid by the deformatter before they are decoded. The values which are invalid are replaced by zero when they are decoded into quantized dct coefficient amplitudes.

The multiplier 340 multiplies each quantized coefficient, of a predetermined group of coefficients, by a value which is a function of Q and the index of the coefficient, to form a stream of normalized coefficients which are extended over cable 335 to the dct block converting memory 330.

The dct block converting memory reorders each group of frequency ordered coefficients into groups of dct coefficient blocks. The dct coefficient blocks are read out of the block converting memory in raster scan order by column and the data stream formed by the sequence of coefficients is extended over cable 325 to the inverse dct calculator 320, where each block of dct coefficients are inverse transformed to produce a block of pixels which are in raster scan order by row. The sequence of pixels formed by the inverse dct calculator are extended over cable 315 to the blocking to image line converting memory 310. The blocking to image line converting memory reads blocks of pixels at its input as supplied over cable 315 from the inverse dct calculator, into locations determined by the identifier supplied over cable 312 and a pixel counter internal to the blocking to image line converting memory, and supplies image pixels in raster scan by line order at it's output over cable 305.

Identifiers are not sent for those blocks of data which were not recovered, hence, in the picture in shuttle mode of operation, the only parts of the image which are updated with new pixels are those for which a partial or complete reconstruction of the visibility ordered data set from the recovered snatch of data was possible.

Those locations in the image which are not updated with new pixels continue to display the previous picture information. In this way, "old" image blocks are replaced with new image blocks as valid data corresponding to those block locations are retrieved from tape.

The image sharpness and clarity of blocks reproduced from the valid snatches of data sets will depend on how many of the coefficients which comprise a visibility ordered data set are retrieved.

It may be desirable in certain applications to reconstruct image blocks using a fixed number of the high visibility coefficients for all recovered blocks, so that the general appearance of the overall image is uniform, rather than a mosaic of sharp and blurry blocks. It may further be desirable to form the ordered data sets from blocks taken from horizontal or vertical strips of the image, so that the picture in shuttle is updated by strip rather than by random replacement of individual blocks.

In the foregoing manner, the decompression arrangement of FIG. 3 plays back the transformed, visibility ordered, normalized, compressed, synchronized and formatted image data block and de-formats, decodes, unorders, and inversely transforms the image data image block coefficients so as to permit the either partial or complete reconstruction of the television image from the image block data. In addition, and as will shortly be made more clear, at the exceedingly high playback speeds, which are normal in the picture-in-shuttle mode, only a fraction of the data on each track of a magnetic tape can usually be recovered. As mentioned, some, but not necessarily all, of the visibility ordered and formatted data set coefficients that are played back in a picture-in-shuttle mode from a recorder can be recovered. The snatches of compressed data that are recovered at the high picture-in-shuttle speed can be used, in accordance with the principles of our invention, to reconstruct a incomplete, yet recognizable, image. Again, the terms an "incomplete image" or a "partial image" are meant to communicate the sense that the image is reconstructed using less than all the dct coefficients and hence not all the information known about the image was used in its reconstruction. Stating differently, but meaning the same thing, the image was reconstructed with a partial complement, i.e. with some but not all, of the dct coefficients which define the image. This also means that sufficient information is retrieved in a snatch to reconstruct all the pixels in an image block; however, since not all the dct coefficients are retrieved the image detail represented by the pixels is likely to be degraded. Again, it is worth repeating that the television image can be reconstructed using less than all the digital information that defines the image to be displayed and in that manner there is a partial reconstruction of the picture image. As a result even though the entire area of the image is reconstructed that which is reconstructed may lack detail or sharpness because not all of the dct coefficients that define the image were used in its partial reconstruction.

Then as the speed of the playback device is reduced toward a "normal" speed, larger snatches, and hence more of the visibility ordered coefficients, can be recovered and used in reconstructing a partial-to-complete video image. Generally speaking, the larger the number of visibility ordered coefficients that are recovered the better the picture quality. Eventually, as the speed of the playback device is reduced to its normal operating speed, the snatch of information that is recovered will typically comprise the entire set of visibility ordered coefficients. Since the entire set of image data can be recovered, it then is possible to reconstruct a complete video image. In that manner, a human editor can increase or decrease the playback speed in the picture-in-shuttle mode to isolate specific scene(s) or video image(s), for example, as a specific field or a frame of video from the ordered and formatted transformed data set of image blocks that are recorded on a magnetic tape.

Now, to more particularly understand the principles of our invention, let us interrelate (a) television image 100, (b) the CCIR-601 standard, and (c) the plurality of image blocks. For a single video field, there being two fields in a television frame, the CCIR-601 standard contemplates an image data matrix array comprising 720 pixels in the horizontal, or x-axis, direction and 244 pixels in the vertical, or y-axis, direction. Using a somewhat conventional coordinate system for describing a television display, assume an x,y coordinate system with the origin, or 0,0 point, located in the upper left hand corner of the display. The pixels in a row in the horizontal direction, like points on the x-axis of a two-dimensional chart, can be viewed as being situated in columns, which can be numbered from left-to-right beginning at column zero and sequentially increasing to column 719. Similarly, the pixels in a column in the vertical direction, like points on the y-axis of a two-dimensional chart, can be viewed as being situated in rows, which can be numbered from top-to-bottom beginning at row zero and sequentially increasing to row 243. Using the foregoing two-dimensional chart as a descriptive tool, the pixels, which comprise a field of television image 100, can each be uniquely identified by their respective coordinate position in a pixel array P. Consider that pixel P(i, j) is located at the i-th row and the j-th column of a pixel array P. Using mathematical symbols the pixel array P can be written in the following form:

$$P = \begin{matrix} P(0,0) & P(0,1) & P(0,2) & \ldots & P(0,719) \\ P(1,0) & P(1,1) & P(1,2) & \ldots & P(1,719) \\ P(2,0) & P(2,1) & P(2,2) & \ldots & P(2,719) \\ P(3,0) & P(3,1) & P(3,2) & \ldots & P(3,719) \\ & & \vdots & & \\ P(243,0) & P(243,1) & P(243,2) & \ldots & P(243,719) \end{matrix} \quad (1)$$

As an aside, it should now be clear that algebraic charts typically are described in terms of (x, y) coordinates. It is just as common that matrix notation uses a (row, column) notation, which appears, if you will, as a (y, x) notation rather than a (x, y) notation. In our description, we will use the matrix notation rather than the algebraic notation. Therefore element P(i, j) means the pixel at the coordinate location represented by the i-th row and the j-th column where rows are measured from top-to-bottom of the display and columns are measured from left-to-right.

Continuing, as mentioned, an image block of luminance video data component (Y) like image block 113 is assumed to comprise four pixels vertically and eight pixels horizontally. Therefore, since each image block is 8 pixels wide in the x-direction, there are (720/8=) 90 image blocks in the horizontal direction and, since each image block is 4 pixels high in the y-direction, there are (244/4=) 61 image blocks in the vertical direction.

It should be clear that there are other numbering systems possible. For example, in view of the above, it follows then that there are (61 times 90=) 5,490 image blocks in a field of video and that the image blocks can be numbered, among other ways, 0 through 5,489 so as to uniquely identify each image block in a field. We have chosen for purposes of illustration and not by way of limitation to use a matrix notation in the following illustration of the principles of our invention. In the alternative herein described, each image block can be uniquely identified as an element of a two-dimensional image block matrix-like array.

Now consider that the first 244×720 pixel array P represented by equation (1) above can be partitioned into a plurality of 4×8 pixel sub-arrays, each sub-array corresponding to an image block, to thereby form a second 61×90 image block array B represented by equation (5) described below. In that manner, image block array B comprises a plurality of image blocks where the image block spatially located at image block coordinate position (m, n), which means at the m-th row and the n-th column of the image block array B, is labeled as image block B(m, n) and where each image block comprises a 4×8 pixel sub-array of first pixel array P. To further help understand this concept consider the 4×8 pixel sub-array of first pixel array P which is located in the upper left corner of television image 100. Clearly we are referring to image block 113 of FIG. 1, which for these descriptive purposes is also known as image block B(0, 0) and which is comprised of the 32 pixels P(i, j) from equation (1) that are recited below in equation (2):

$$B(0,0) = \begin{matrix} P(0,0) & P(0,1) & P(0,2) & \ldots & P(0,7) \\ P(1,0) & P(1,1) & P(1,2) & \ldots & P(1,7) \\ P(2,0) & P(2,1) & P(2,2) & \ldots & P(2,7) \\ P(3,0) & P(3,1) & P(3,2) & \ldots & P(3,7) \end{matrix} \quad (2)$$

In a similar fashion each of the image blocks B(m, n) can be generated as a 4×8 partitioned sub-array of first pixel array P such that:

$$B(0,1) = \begin{matrix} P(0,8) & P(0,9) & P(0,10) & \ldots & P(0,15) \\ P(1,8) & P(1,9) & P(1,10) & \ldots & P(1,15) \\ P(2,8) & P(2,9) & P(2,10) & \ldots & P(2,15) \\ P(3,8) & P(3,9) & P(3,10) & \ldots & P(3,15) \end{matrix} \quad (3)$$

et cetera through;

$$B(60,89) = \begin{matrix} P(240,712) & P(240,713) & \ldots & P(240,719) \\ P(241,712) & P(241,713) & \ldots & P(241,719) \\ P(242,712) & P(242,713) & \ldots & P(242,719) \\ P(243,712) & P(243,713) & \ldots & P(243,719) \end{matrix} \quad (4)$$

Using the foregoing notational numbering scheme, the image block represented by equation (2) is spatially located at an image block coordinate position (0, 0) while the image block represented by equation (3) is spatially located at an image block coordinate position (0, 1) et cetera through the image block represented by equation (4) which is spatially located at an image block coordinate position (60, 89).

Using the foregoing notation, the first 244×720 pixel array P represented by equation (1) is partitioned into the second 61×90 image block array B, which can be written in the following form:

$$B = \begin{matrix} B(0,0) & B(0,1) & B(0,2) & \ldots & B(0,89) \\ B(1,0) & B(1,1) & B(1,2) & \ldots & B(1,89) \\ B(2,0) & B(2,1) & B(2,2) & \ldots & B(2,89) \\ B(3,0) & B(3,1) & B(3,2) & \ldots & B(3,89) \\ & & \vdots & & \\ B(60,0) & B(60,1) & B(60,2) & \ldots & B(60,89) \end{matrix} \quad (5)$$

where each element B(m, n) of the image block array B of equation (5) is an 4×8 pixel sub-array of the pixel array P of equation (1). Thus it can be stated:

(i) that each image block B(m, n) of image block array B of equation (5) is comprised of four rows of pixels where each such row of pixels is comprised of eight columns of pixels and (ii) that each image block B(m, n) of the image block array B is comprised of 32 separate pixels and (iii) that each respective image block B(m, n) of image block array B can be generated as described above relative to equations (2), (3) and (4).

With the foregoing foundation, it may now be convenient to discuss some further relationships between a block and a data set.

Firstly, recall that a data set is assumed to comprise 15 image blocks. As earlier mentioned, there are 90 image blocks in the horizontal direction. Accordingly, there are six data sets in the horizontal direction, it being noted that the integer 15 is selected as a convenient integer divisor of the dividend "90 image blocks"

to obtain as an integer quotient the six data sets in the horizontal direction. Clearly, other numbers of image blocks per data set like 30 image blocks per data set can be used in alternative embodiments of the principles of our invention.

Secondly, although the illustrative embodiment of the principles of our invention assumes that a data set comprises 15 consecutive image blocks in the horizontal direction of an image, other embodiments may shuffle the image blocks or randomize the image blocks or otherwise reorient the image blocks which comprise an image in some manner when generating a data set. See, for example, copending application Ser. No. 08/106,968 filed Aug. 16, 1993 which is a continuation of U.S. Ser. No. 654,710 filed Feb. 13, 1991 for an arrangement that shuffles and deshuffles image data.

Thirdly, an illustrative embodiment of the compression technique of the present invention contemplates the line-by-line, which parenthetically means the same thing as the row-by-row, storing of the 720 pixels per row in a converter store until the number of rows which comprise an image block have been stored (here an image block comprises four rows). In our first illustrative embodiment, we store pixels of the video image 100 in a line-to-block converter store memory 440 or 442 of FIG. 4 by writing, on a row-by-row basis, groups of four pixel-rows of the video image 100 in the line-to-block converter store. Procedurally that process can be accomplished:

first, by writing the 720 pixels P(i, j) comprising the i-th pixel-row into the line-to-block converter store for pixel-columns j=0, ..., 719;

second, by writing the 720 pixels P(i+1, j) comprising the (i+1)-st pixel-row into the line-to-block converter store for pixel-columns j=0, ..., 719;

third, by writing the 720 pixels P(i+2, j) comprising the (i+2)-nd pixel-row into the line-to-block converter store for pixel-columns j=0, ..., 719;

fourth, by writing the 720 pixels P(i+3, j) comprising the (i+3)-rd pixel-row into the line-to-block converter store for pixel-columns j=0, ..., 719; and fifth, iterate the process represented by the above four steps until each row of the rows i=0, 1, ..., 243 of pixels P(i, j) for pixel-columns j=0, ..., 719 has been written into the line-to-block converter store, i.e. until an entire field, which comprises part of television image 100, has been written into the line-to-block converter store.

After the entire field is written into a line-to-block converter store memory 440 or 442, a row-of-blocks comprising four pixel-rows of stored pixel data is read from the converter store. It ought to be noted that, in what follows, each "row-of-blocks" is also hereinafter known as a "block-row." Now, as to reading from the converter store, firstly, blocks are read block-by-block generally in a left-to-right direction for block-columns zero through 89 (i.e. n=0, ..., 89) and then, secondly, blocks are read row-of-blocks-by-row-of-blocks generally in a top-to-bottom direction for block-rows zero through 60 (i.e. m=0, ..., 60).

As an aside, it should be mentioned that in this illustrative embodiment, we describe blocks being read (a) in terms of a block-row being read in a generally left-to-right direction and (b) in terms of block-rows being read in a generally top-to-bottom direction. Clearly a block can be read in a generally right-to-left direction as well as a left-to-right direction and block-rows can be read in a generally bottom-to-top direction as well as a top-to-bottom direction. Similarly, pixels can be stored by column as well as by row. Other variations are also feasible. Accordingly and as will become patently clear, if it is not already, those forms of reading and writing are only for purposes of description and are not by way of limitation.

Continuing, more particularly, each image block B(m, n) in a block-row m has four pixel-rows and eight pixel-columns of image data. The pixels are read in such a manner that the eight pixel-columns of an image block are read from one pixel row and then the eight pixel-columns from the next pixel-row are read, et cetera, i.e. the pixels are read pixel-row-by-pixel-row, from a first block in the converter store before the pixels are read from next consecutive (or from a second) block in the converter store. After a block is so read, it is thereupon tendered for subsequent dct processing.

In the one illustrative embodiment just mentioned, we read the eight columns which comprise one of the four pixel-rows of an image block B(m, n) of the video image 100 from the line-to-block converter store before we read the eight columns which comprise the next one of the four pixel-rows of the image block. That process of the reading each of the n blocks B(m, n) for n=0, 1, ..., 89 that comprise the m-th row-of-blocks may be described as follows:

first, read the eight pixel elements P(i, j) corresponding to pixel-row i and pixel columns j=k, k+1, ..., k+7 of block B(m, n) from the line-to-block converter store;

second, read the eight pixel elements P(i+1, j) corresponding to pixel-row (i+1) and pixel columns j=k, k+1, ..., k+7 of block B(m, n) from the line-to-block converter store;

third, read the eight pixel elements P(i+2, j) corresponding to pixel-row (i+2) and pixel columns j=k, k+1, ..., k+7 of block B(m, n) from the line-to-block converter store;

fourth, read the eight pixel elements P(i+3, j) corresponding to pixel-row (i+3) and pixel columns j=k, k+1, ..., k+7 of block B(m, n) from the line-to-block converter store;

fifth, iterate by incrementing n and repeat the above four steps until the next block in block-row m of block array B has been read, i.e. increment n and read B(m, n) for n=0, 1, ..., 89 and when the last image block (i.e., B(m, 89)) in the m-th block-row has been read; then sixth, iterate by incrementing m and repeat the above five steps for the next block-row of image block array B. That is, increment m and read B(m, n) for each of block-rows zero through 60 (i.e. for m=0, 1, ..., 60).

Stated differently but meaning the same thing, in this one illustrative embodiment, we read left-to-right (remembering, of course, that an alternative embodiment could read right-to-left or yet in still a different direction). Reading left-to-right means that we read (one-by-one and in a first prefixed direction) the eight pixels that comprise each of the four rows of pixel image data of image block B(0, 0). Then we read the eight pixels in each of the four rows of pixel image data that comprise image block B(0, 1) et cetera. That is, we read blocks B(0, n) for n=0, 1, ..., 89 until the 90 image blocks, which comprise the first block-row m=0 of the video image have been read from the converter store and tendered for dct processing. Then the process iterates and repeats for the second row-of-blocks (or block-row), i.e. for second block-row m=1 we read image blocks B(1, n) for n=0, 1, ..., 89, followed by the third row-of-blocks, i.e. for third block-row m=2 we read B(2, n) for n=0, 1, ..., 89, until all the 61 block-rows of image blocks have been read and tendered for dct processing.

Note the distinction between the process of writing into a converter store and the process of reading from the same converter store. In particular, note that, on the one hand, in the writing process, all 720 pixels which comprise an entire row of pixels in the video image are written in the converter store, before any of the next row of pixels is written. On the other hand, the reading process is different. The pixels in a row are stratified by image block so that the entire row is not read at one time. Rather only that number of pixels, which define the width of an image block, is read at one time. In this one illustrative embodiment, the rows are stratified into eight-pixel wide image blocks so that, rather than reading the entire row of 720 pixels, only eight pixels are read from one row whereupon eight pixels are read from the next row et cetera. In that manner, the converter store also functions as a line-to-block converter.

While an already stored first group of image blocks is being read from a first line-to-block converter store, for example, image blocks B(0, n) for n=0, 1, ..., 89 are read on a block-by-block basis, a second group of pixels from the video image can be written and stored in a second line-to-block converter store, for example, the pixels comprising image blocks B(1, n) for n=0, 1, ..., 89, can then be written in the second line-to-block converter store on a pixel-row-by-pixel-row basis. Upon the first group of four pixel-rows (or image blocks) having been read from the first line-to-block converter store and upon the second group image blocks having been written for storage in the second line-to-block converter store, the converter store functions can then be reversed- That is, when a third group of image blocks comes along, the third group can be written for storage in the first line-to-block converter store on a pixel-row-by-pixel-row basis while the second group of four pixel-rows of the video image is read from the second line-to-block converter store and tendered for dct processing on a block-by-block basis. The technique alternates between reading (or writing) the 90 image blocks in one "row-of-blocks" (for example, the m-th row-of-blocks) and writing (or reading) the 90 image blocks in "another row-of-blocks" (for example, the (m+1)-st row-of-blocks) and that the alternating continues through all of the 61 "rows-of-blocks" in a video field.

It will be appreciated, in view of the above description, that information is written into a line-to-block converter store on an image row-by-row basis (i.e. there being 720 pixels per image row) and that information is read from a line-to-block converter store on a block-row-by-block-row basis (i.e. there being 8 pixels per row per image block and there being 90 image blocks per block-row.). Coupled with the aforedescribed functions of alternately reading and storing image blocks is the soon to be described compression technique of the present invention.

As an aside, it is mentioned that typical of transform and compression systems for receiving and processing compressed data are the systems described in copending U.S. applications (a) Ser. No. 07/560,606 filed Jul. 31, 1990, which issued on Sep. 8, 1992 as U.S. Pat. No. 5,146,324 and which is entitled "Data Compression Using A Feedforward Quantization Estimator;" (b) Ser. No. 08/106,968 filed Aug. 16, 1993 which is a continuation of Ser. No. 07/654,710 filed Feb. 13, 1991 and which is entitled "Method and Apparatus for Shuffling Image Data into Statistically Averaged Data Groups and for Deshuffling the Data;" and (c) Ser. No. 07/731,557 filed Jul. 17, 1991, which is a continuation-in-part of Ser. No. 07/688,923 filed Apr. 18, 1991 and entitled "Method and Apparatus for Determining a Quantizing Factor for Multi-Generation Data Compression/Decompression Processes," all of which are assigned to the assignee of the instant application.

Figure 4:
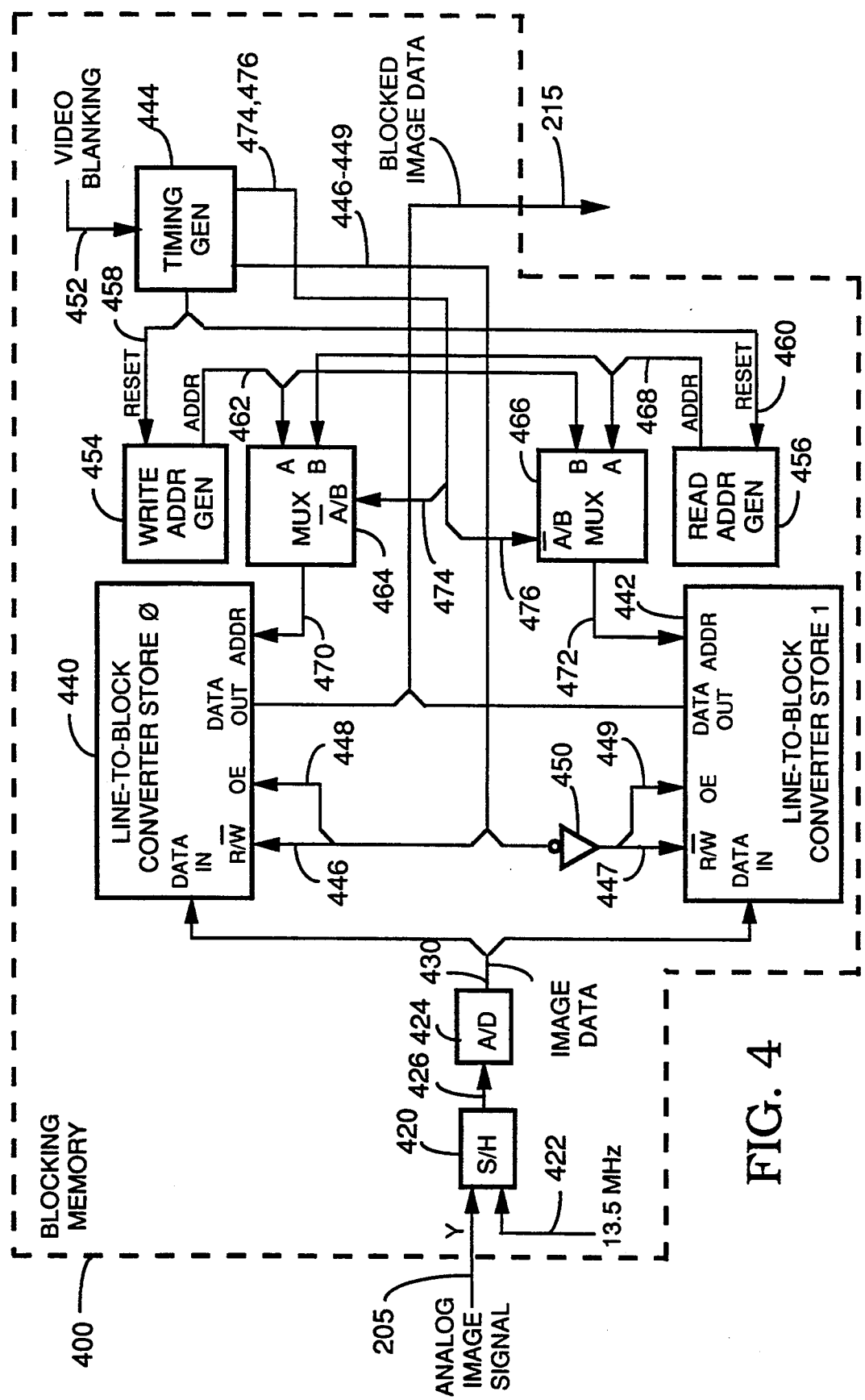
FIG. 4 illustrates a blocking memory of the type usable in the compression arrangement of FIG. 2.

Continuing now with the description of an illustrative embodiment of the principles of our invention, FIG. 4 illustrates blocking memory 400 which is of a type usable in FIG. 2 as blocking memory 400-1 and/or blocking memory 400-2. The luminance component (Y) of an analog image signal can be supplied to a luminance channel 205-1. If a chrominance signal is to be compressed, the (R-Y) and (B-Y) chrominance components would be alternately supplied to a chrominance channel 205-2. The chrominance channel could, but need not, be similar to the luminance channel. The chrominance channel is further adapted to process two alternate color component signals (R-Y) and (B-Y), wherein each color component has approximately one-half the bandwidth of the (Y) luminance component and accordingly requires only one-half the sampling rate, one-half of a converter store memory, et cetera.

More particularly, in FIG. 4, an image signal component like the Y component as well as the alternately supplied B-Y component or R-Y component, if any, can be supplied over cable 205, which is equivalent to either cable 205-1 or cable 205-2, to blocking memory 400, which is equivalent to either blocking memory 400-1 or blocking memory 400-2, and therein to a sample and hold (S/H) circuit 420, where it is sampled at, for example, a 13.5 megahertz (MHz) rate via a clock input 422 to the S/H circuit 420. The sampled signals are supplied over a cable 426 to an analog-to-digital converter (A/D) 424. In practice, the S/H circuit 420 would likely be integral with the A/D converter 424. The resulting digital image component data signal is supplied via a bus 430, as will shortly be described, for further processing by other apparatus of blocking memory 400. After processing and passing through blocking memory 400, the line-to-block converted image data is supplied via an 8 bit bus cable 215, which is equivalent to either cable 215-1 or cable 215-2, through a respective dct circuit 220-1 or 220-2, visibility ordering memory 500, et cetera as described above relative to FIG. 2. In that manner, the system to which the line-to-block converted image data is supplied includes, among other things, structural means for suitably transforming the image block data from a spatial time domain to a spatial frequency domain, for ordering the transformed image block data by visibility measure, for encoding the compressed image data, and for formatting the compressed image data. The ordered and compressed and encoded and formatted image data then (a) may be supplied to a transmission channel to be sent to a receiver or (b) may be recorded as successive segments of image data in allotted data sync blocks on a recording medium depicted herein by a recorder 280. In either application the image data can be reconstructed at the receiver or from a playback device to provide a suitably reconstructed video image.

As to the further processing by the apparatus of blocking memory 400, blocking memory 400 also includes a pair of line-to-block converter store memories 440 and 442, which alternately receive the raster scanned and digitized video image data over cable 205 and output the blocked image data in the 8 bit digital sample format over cable 215.

In the one illustrative (field by field) embodiment that was described earlier, one entire 244×720 pixel field of image video 100 may be in the process of being stored line-by-line in a first line-to-block converter 440 (or 442) while a second entire 244×720 pixel field of image video 100 may be in the process of being read block-by-block from a second line-to-block converter 442 (or 440) where the memories 440 and 442 are alternately switched between each other at the field rate.

In a second alternative (block-row by block-row) embodiment that will now be described, the memories 440 and 442 are alternately switched between each other at one-fourth (¼-th) a typical line rate of (13.5 million samples per second divided by 720 samples per line=) 18,750 lines per second (also stated herein as 18.75 kilohertz (KHz)). This coincides with there being four rows per block-row and means that the alternate switching between the memories 440 and 442 can occur at a rate of about 4,687 times per second to thus store and recover alternate block-rows rather than alternate fields. (Recall that there are four rows of pixels in each block-row) In that manner, the m-th block-row of image blocks B(m, n) for n=0, ..., 89 can be read block-by-block from one line-to-block converter 440 (or 442) while the (m+1)-st row of image blocks B(m+1, n) for n=0, ..., 89 is being written line-by-line into the other line-to-block converter 442 (or 440). {Note that with blanking time still in the video and with there actually being 858 pixels per line including blanking (versus 720 pixels per line), the true line switching rate is about 15.734 KHz versus the mentioned 18.75 KHz.}

In either embodiment or in another embodiment that can readily be structured using the principles of our invention, the line-to-block converted image data are supplied over cable 215 as a series of 4×8 image blocks each having 32 pixels and each being either (a) a respective one of the 4×8 image blocks that comprise the luminance (Y) component of television image 100 or (b) a 4×4 image block that comprises the (R-Y) chrominance component of television image 100 and a 4×4 image block that comprises the (B-Y) chrominance component of television image 100 so that the two 4×4 chrominance components form a 4×8 chrominance block.

To this end, in the second alternative embodiment now being described, the digitized input image data on cable 430 is presented to both of the line-to-block converter memories 440 and 442. Each of the memories 440 and 442 includes corresponding converter store memory locations for the respective luminance (Y) component or (R-Y), (B-Y) chrominance components of the image data and, in particular, for storing alternate block-rows of image data. A timing generator 444 controls which of the two converter store memories is activated for reading and which of the two converter store memories is activated for writing, at any given time. Timing generator 444 provides the memory control signals in response to a vertical blanking signal (V sync) on a line 452 supplied from system control (not shown) to the timing generator 444. Timing generator 444 operates in response to respective read and write signals on read/write (R/W) lines 446 and 447 and in response to respective enable signals on OE lines 448 and 449. As illustrated, the R/W line 446 and OE line 448 are supplied to the memory 440 while the R/W line 447 and OE line 449 are supplied to the memory 442. The R/W and OE control signals are inverted by an inverter 450 before being supplied to the memory 442 via lines 447 and 449, respectively. Thus one memory is being written into on a row-by-row basis while the other is being read from on a block-by-block basis. After four lines, or rows, of pixel data are written into one memory 440 (or 442) and after one block-row of blocks is read from the other memory 442 (or 440), the functional roles of the two memories 440 and 442 are reversed.

In accordance with the principles of our invention, the memories 440 and 442 are used alternately and continuously to receive as well as to store the image data in image sequential format and to then continuously read as well as to supply the image data in image blocked format on a block-row basis, i.e. on a four-rows-of-pixels-by-eight-columns-of-pixels basis. To this end, on the one hand, write address generator 454 controls the storage address for the writing of the image data in the converter memories in a raster scanned order, while, on the other hand, read address generator 456 controls the retrieval address for the reading of the image data in the desired image blocked format from the respective converter memory. Recall that the reading of the image block data is from the respective memory which is not currently being written. Specifically, in response to a video blanking signal 452, the write (454) and read (456) address generators receive reset signals from the timing generator 444 via lines 458 and 460, respectively. In response thereto, the address generators 454, 456 supply write, read address signals, respectively, to one or the other of the line-to-block converter store memories 440, 442 on an alternating basis between the memories.

To this end, an address output of the write address generator 454 is supplied over a bus 462 to the A and B inputs, respectively, of a pair of multiplexers 464 and 466 associated with respective the memories 440 and 442. In response to the write address output of the write address generator 454, the respective multiplexer 464 or 466 supplies the respective write addresses for storing the data in the respective memory 440 or 442 in the desired order, here the order in which the samples and lines of video are scanned in the image, i.e., in a television raster scan sequential format order.

The read addresses initiated by the timing generator 444 and supplied by the read address generator 456 are similarly directed to the B and A inputs, respectively, of the respective multiplexers 464 and 466 via a bus 468. The read addresses correspond to the memory locations as determined by the image block size and by the sequential order desired, here, for example, 4×8 image blocks in a spatially sequential order.

Multiplexer 464 supplies the respective read address signal at its B input or write address signal at its A input, whichever is active at a moment in time, to the memory 440 via an address bus 470. Similarly, multiplexer 466 supplies the respective write address signal at its B input or read address signal at its A input, whichever is active at a moment in time, to memory 442 via an address bus 472. Timing generator 444 controls the individual multiplexers so as to activate whether the read address or the write address should be supplied to the respective memory. Timing generator 444 provides control signals (V sync and H sync) in response to the video blanking signal 452 via buses 474 and 476 which are coupled to respective select (Not A)/B input of the respective multiplexers 464, 466.

Read address generator 456 generates addresses in such a way that the sequentially stored image data are read out of the memories 440, 442 in the requisite image block order. For example, one of the two memories, say a first memory, is written line-by-line until four rows are stored. Thereupon the function of the first memory changes from a write function to a read function and all blocks in a block-row of the one memory are read block-by-block from the first memory. Symbolically, that can be illustrated by the first memory having been written with pixels P(i, j) representing the first four rows of the pixel array P of equation (1):

$$P(0,0) \quad P(0,1) \quad P(0,2) \quad \ldots \quad P(0,719) \qquad (6)$$
$$P(1,0) \quad P(1,1) \quad P(1,2) \quad \ldots \quad P(1,719)$$
$$P(2,0) \quad P(2,1) \quad P(2,2) \quad \ldots \quad P(2,719)$$
$$P(3,0) \quad P(3,1) \quad P(3,2) \quad \ldots \quad P(3,719)$$

Those first four rows of the pixel array P of equation (1) are shown above in equation (6). Those first four rows of the pixel array P of equation (6) also represent the first row of block array B of equation (5), which can be rewritten in the following form as equation (7):

$$B(0, 0) \; B(0, 1) \; B(0, 2) \ldots B(0, 89) \qquad (7)$$

Each of the luminance (Y) blocks, which can be any block such as illustrative block B(m, n) from block array B, is assumed in this illustrative description to comprise a 4×8 pixel subarray, which in turn includes 32 pixels P(i, j). Using a somewhat different and new mathematical notation, each of the respective 32 luminance (Y) pixels P(i, j) in any block B(m, n) can be written as a respective luminance pixel Y(k), which, in turn, can be written using the following alternative 4×8 matrix pixel subarray array notation:

$$B(m,n) = \begin{array}{cccccccc} Y(0) & Y(1) & Y(2) & Y(3) & Y(4) & Y(5) & Y(6) & Y(7) \\ Y(8) & Y(9) & Y(10) & Y(11) & Y(12) & Y(13) & Y(14) & Y(15) \\ Y(16) & Y(17) & Y(18) & Y(19) & Y(20) & Y(21) & Y(22) & Y(23) \\ Y(24) & Y(25) & Y(26) & Y(27) & Y(28) & Y(29) & Y(30) & Y(31) \end{array} \qquad (8)$$

Now for convenience of description, each respective luminance pixel P(i, j), which is shown in the new notation as Y(k), of any luminance block B(m, n) can be uniquely identified by a respective integer k=0, 1, ..., 31. Refer also to equations (2), (3) and (4) and the description related thereto. Those equations can also be rewritten in the form of equation (8).

With that notational background and as earlier described, the reading from blocking memory 400 of any luminance block B(m, n) in a block-row is done row-by-row within the block B(m, n). That being the case, the luminance pixels Y(k) of block B(m, n) are read row-wise and are then extended serially over cable 215-1 as a serial sequence of 32 elements represented by the following equation (9):

$$\begin{array}{cccccccc} Y(0); & Y(1); & Y(2); & Y(3); & Y(4); & Y(5); & Y(6); & Y(7); \\ Y(8); & Y(9); & Y(10); & Y(11); & Y(12); & Y(13); & Y(14); & Y(15); \\ Y(16); & Y(17); & Y(18); & Y(19); & Y(20); & Y(21); & Y(22); & Y(23); \\ Y(24); & Y(25); & Y(26); & Y(27); & Y(28); & Y(29); & Y(30); & Y(31); \end{array} \qquad (9)$$

In similar fashion any of the chrominance (R-Y) or (B-Y) blocks like block B(m, n) comprises a 4×4 pixel subarray that includes 16 pixels P(i, j). Using a notation similar to the symbol Y(k) that we use for luminance (Y) pixels, each of the respective 16 chrominance pixels P(i, j) in block B(m, n) can be written as a respective pixel $C_h(k)$, which, in turn, can be written in the following alternative 4×8 matrix pixel subarray array format:

$$\begin{array}{cccc} C_h(0) & C_h(1) & C_h(2) & C_h(3) \\ C_h(4) & C_h(5) & C_h(6) & C_h(7) \\ C_h(8) & C_h(9) & C_h(10) & C_h(11) \\ C_h(12) & C_h(13) & C_h(14) & C_h(15) \end{array} \qquad (10)$$

Now for convenience of description, each respective chrominance pixel P(i, j), also shown as $C_h(k)$, of any block B(m, n) can be identified by a respective integer k=0, 1, ..., 15. As a further notation, the symbol $C_{R-Y}(k)$ means the (R-Y) chrominance component while the symbol $C_{B-Y}(k)$ means the (B-Y) chrominance component. Thus the "h" in $C_h(k)$ can be substituted with a "R-Y" meaning the (R-Y) chrominance component or with a "B-Y" meaning the (B-Y) chrominance component.

With that notational background and as earlier described, the reading from blocking memory 400 of any chrominance block B(m, n) in a block-row is done row-by-row within the block B(m, n). That being the case, the chrominance pixels $C_h(k)$ of chrominance block B(m, n) are read row-wise and are then extended serially over cable 215-2 as the serial sequence of 16 elements represented by the following equation (11):

$$\begin{array}{ccccccc} C_h(0); & C_h(1); & C_h(2); & C_h(3); & C_h(4); & C_h(5); & C_h(6); \\ C_h(7); & C_h(8); & C_h(9); & C_h(10); & C_h(11); & C_h(12); & C_h(13); \\ C_h(14); & C_h(15) & & & & & \end{array} \qquad (11)$$

Stated differently but with the same result, it should be understood from the above example that blocking memory 400, within which the image data are written, stores the image data in a first sequential order such as the order depicted by equations (1) and (6) in memory locations provided by write address generator 454. Then blocking memory 400, from which the written image data are read, supplies the stored data in a second sequential order such as the order depicted in either equation (9) or equation (11), respectively, for luminance and chrominance pixels, respectively, from memory locations provided by read address generator 456.

Returning for a moment to FIG. 2, as earlier mentioned, dct circuits 220-1 or 220-2, which can be embodied, for example, with a Model STV 3200 discrete cosine transform circuit supplied by Thomson CSF, provide the dct coefficients for the respective image blocks over cable 225-1 or 225-2 to visibility ordering memory 500 wherein data set arrays are formed and operated upon in order to supply the image block dct coefficients in an order that is ranked by a visibility measure.

Reference the row-column structure of block B(m, n) illustrated in equation (8). Rather than reading equation (8) according to the serial row-wise sequence shown in equation (9), dct circuit 220-1 sequentially provides the dct luminance (Y) coefficients ($\mathcal{Y}$) on cable 225-1 in a serial column-wise sequence shown in equation (12), to wit the luminance coefficient block ($\mathcal{Y}$) corresponding to the luminance pixel block shown in equation (8) would be read column by column to obtain the column-wise sequence of luminance dct coefficients $\mathcal{Y}(k)$ shown in equation (12):

$$\begin{aligned}&\mathcal{Y}(0);\ \mathcal{Y}(8);\ \mathcal{Y}(16);\ \mathcal{Y}(24);\ \mathcal{Y}(1);\ \mathcal{Y}(9);\ \mathcal{Y}(17);\ \mathcal{Y}(25);\ \mathcal{Y}(2);\\&\mathcal{Y}(10);\ \mathcal{Y}(18);\ \mathcal{Y}(26);\ \mathcal{Y}(3);\ \mathcal{Y}(11);\ \mathcal{Y}(19);\ \mathcal{Y}(27);\ \mathcal{Y}(4);\ \mathcal{Y}(12);\\&\mathcal{Y}(20);\ \mathcal{Y}(28);\ \mathcal{Y}(5);\ \mathcal{Y}(13);\ \mathcal{Y}(21);\ \mathcal{Y}(29);\ \mathcal{Y}(6);\ \mathcal{Y}(14);\ \mathcal{Y}(22);\\&\mathcal{Y}(30);\ \mathcal{Y}(7);\ \mathcal{Y}(15);\ \mathcal{Y}(23);\ \mathcal{Y}(31)\end{aligned} \quad (12)$$

In that manner that dct circuit 220-1 also functions as "(pixel) line to (dct coefficient block) column" converter.

Similarly, reference the row-column structure of a chrominance block B(m, n) of pixels as is illustrated in equation (10). Rather than the row-wise sequence shown in equation (11), dct circuit 220-2 functions to sequentially provide the dct chrominance coefficients on cable 225-2 in a column-wise sequential order such as that shown in equation (13), to wit in the following column-wise sequential order:

$$\begin{aligned}&C_h(0);\ C_h(4);\ C_h(8);\ C_h(12);\ C_h(1);\ C_h(5);\\&C_h(9);\ C_h(13);\ C_h(2);\ C_h(6);\ C_h(10);\ C_h(14);\\&C_h(3);\ C_h(7);\ C_h(11);\ C_h(15)\end{aligned} \quad (13)$$

It is in that manner that dct circuit 220-2 also functions as "(pixel) line to (dct coefficient block) column" converter.

As an aside, it may be commented that the sequential ordering of coefficients shown by equations (12) and (13) is a raster scan representation of the temporal ordering of the data.

Continuing, before going into the details of visibility ordering memory 500, the following prologue represents an effort to clarify the relationship among three types of arrays used in this description, i.e., among data set arrays DS, block arrays B and pixel arrays P.

Recall that a first 244×720 pixel array P such as that represented by equation (1) can be partitioned into a plurality of 4×8 pixel sub-arrays, each pixel sub-array corresponding to an image block, to form a second 61×90 image block array B such as that represented by equation (5). In a similar manner, the second 61×90 image block array B can itself be partitioned into a plurality of block sub-arrays, each block sub-array corresponding to what we call a "data set," to form a third 61×6 data set array DS, which we now describe.

Assume that, in our illustrative embodiment and not by way of limitation, data set array DS comprises a plurality of data sets where the data set element spatially located at data set coordinate position (u, v), which means at the u-th row and the v-th column, of the data set array DS is labeled as data set DS(u, v). Assume also that, in our illustrative embodiment and not by way of limitation, each data set comprises 15 row-wise contiguous image blocks of a block-row of second image block array B. To make this more clear, consider one data set element DS(0, 0):

$$DS(0, 0) = B(0, 0)\ B(0, 1) \ldots B(0, 13)\ B(0, 14) \quad (14)$$

Note that DS(0, 0) comprises 15 contiguous image blocks B(m, n) from block-row zero (m=0) of the second image block array B. In a similar fashion, DS(0, 1); DS(0, 2); DS(0, 3); DS(0, 4); and DS(0, 5) comprise respectively the second (equation (15)), third (equation (16)), fourth (equation (17)), fifth (equation (18)) and sixth (equation (19)) groups of 15 contiguous image blocks B(m, n) from block-row zero (m=0) of the second image block array B. In still further fashion, each of the data set elements DS(u, v) of the third data set array DS can be generated from a respective 1×15 partitioned sub-array of the respective block-rows of second block array B. The mathematical notation of the foregoing means that:

$$\begin{aligned}DS(0, 1) &= B(0, 15)\ B(0, 16) \ldots B(0, 28)\ B(0, 29) & (15)\\ DS(0, 2) &= B(0, 30)\ B(0, 31) \ldots B(0, 43)\ B(0, 44) & (16)\\ DS(0, 3) &= B(0, 45)\ B(0, 46) \ldots B(0, 58)\ B(0, 59) & (17)\\ DS(0, 4) &= B(0, 60)\ B(0, 61) \ldots B(0, 73)\ B(0, 74) & (18)\\ DS(0, 5) &= B(0, 75)\ B(0, 76) \ldots B(0, 89)\ B(0, 90) & (19)\end{aligned}$$

$$\vdots$$

$$DS(60, 5) = B(60, 75)\ B(60, 76) \ldots B(60, 88)\ B(60, 89) \quad (20)$$

Using the foregoing numbering notation, the data set represented by equation (14) is spatially located at data set coordinate position (0, 0) of the third data set array DS while the data set represented by equation (15) is spatially located at data set coordinate position (0, 1) et cetera including the data set represented by equation (20) which is spatially located at data set coordinate position (60, 5) of the third data set array DS.

Using the foregoing notation, the first 244×720 pixel array P represented by equation (1) is partitioned into the second 61×90 image block array B represented by equation (5), which in turn is partitioned into the third 61×6 data set array DS represented by equations (14) through (20) and can be written in the form of equation (21):

$$DS = \begin{matrix} DS(0,0) & DS(0,1) & DS(0,2) & \ldots & DS(0,5) \\ DS(1,0) & DS(1,1) & DS(1,2) & \ldots & DS(1,5) \\ DS(2,0) & DS(2,1) & DS(2,2) & \ldots & DS(2,5) \\ DS(3,0) & DS(3,1) & DS(3,2) & \ldots & DS(3,5) \\ \vdots \\ DS(60,0) & DS(60,1) & DS(60,2) & \ldots & DS(60,5) \end{matrix} \quad (21)$$

where each data set element DS(u, v) comprises a sub-array grouping of 15 consecutive image blocks from a block-row of second image block array B represented by equation (5) and where each image block B(m, n) comprises four rows of pixels and eight columns of pixels and where each image block B(m, n) of the image block array B comprises 32 separate pixels.

With that additional background, well known dct circuits 220-1 and 220-2 provide the dct coefficients ($\mathcal{Y}$ and $C_h$) for each block of the luminance and chrominance components of image data respectively over cable 225-1 or 225-2 to visibility ordering memory 500:

(a) where firstly the luminance (𝑌) dct coefficients (Y) on cable 225-1 are multiplexed by multiplexer 520 with the chrominance (B-Y) and (R-Y) dct coefficients ($C_i$) on cable 225-2 to form a third transform color component data set array DS of dct coefficients and (b) where secondly the dct coefficients which comprise the third transform color component data set array DS are ordered by visibility measure and then extended over cable 235 to quantizer 240.

Figure 5:
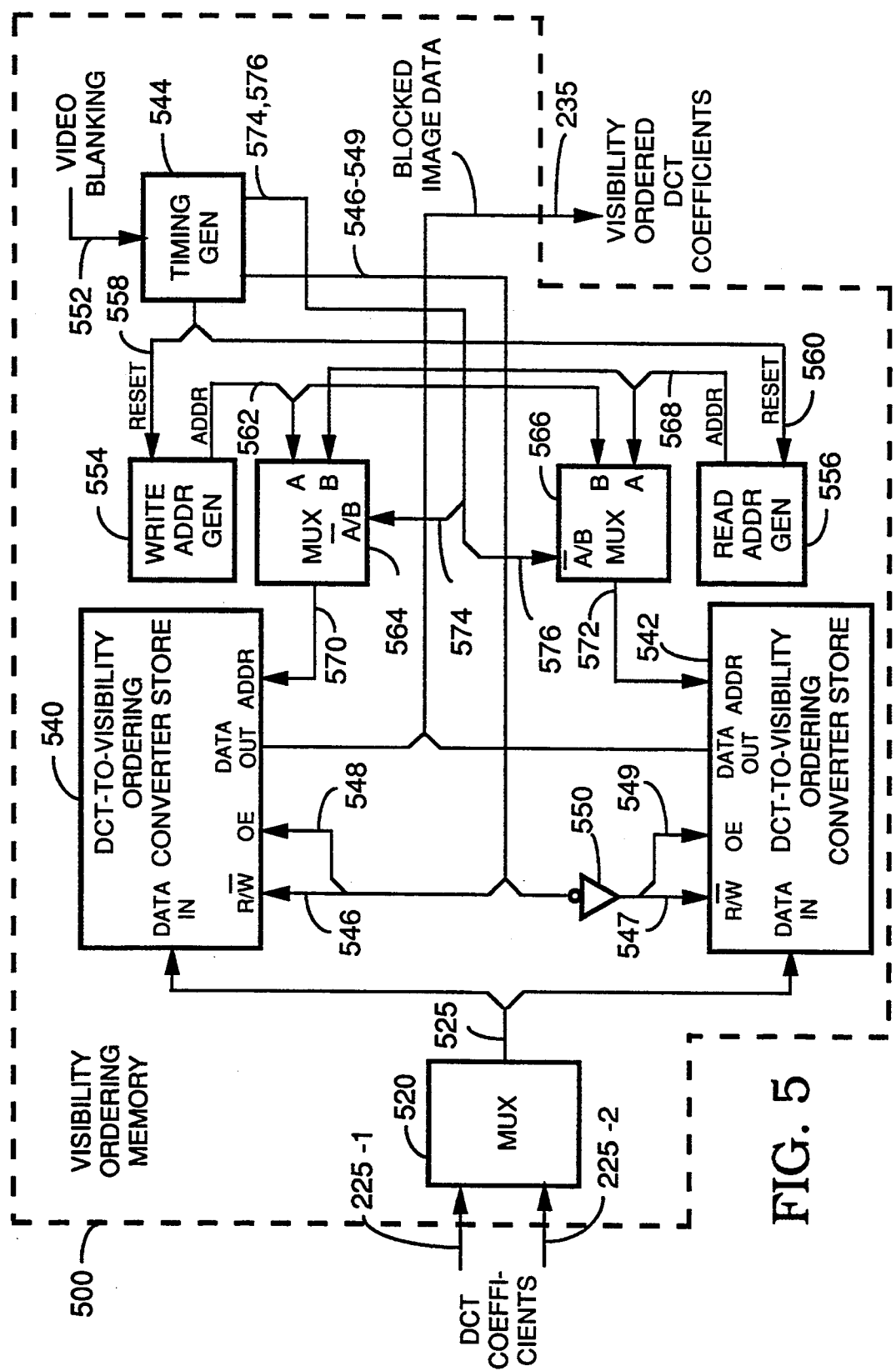
FIG. 5 illustrates a visibility ordering memory of the type usable in the compression arrangement of FIG. 2.

Turning now to a more detailed description of the visibility ordering memory 500 shown FIG. 5, the dct coefficients 𝑌 and $C_h$) of the dct transformed image blocks are serially provided in the column-wise sequence depicted by equation (12) and equation (13) respectively for the luminance (Y) and chrominance ($C_h$) components respectively of the image data from the respective dct circuit 220-1 or 220-2 over a respective cable 225-1 (for the 𝑌 dct coefficients) or 225-2 (for the $C_h$ dct coefficients) to visibility ordering memory 500 and therein to multiplexer 520 where the luminance (Y) dct coefficients (𝑌) on cable 225-1 can be multiplexed with the chrominance (B-Y) dct coefficients ($C_{B-Y}$) on cable 225-2 until the 16 dct coefficients of the $C_{B-Y}$ block are exhausted whereupon the luminance (Y) dct coefficients (𝑌) on cable 225-1 can be multiplexed with the chrominance (R-Y) dct coefficients ($C_{R-Y}$) on cable 225-2 until the 16 dct coefficients of the $C_{R-Y}$ block are exhausted, et cetera. More particularly, the multiplexed dct coefficients would result in a sequential multiplexed data stream comprising the following order of dct coefficients:

$$(22)$$

| | | | | |
|---|---|---|---|---|
| $C_{B-Y}(0);$ | 𝑌(0); | $C_{B-Y}(4);$ | 𝑌(8); | $C_{B-Y}(8);$ 𝑌(16); |
| $C_{B-Y}(12);$ | 𝑌(24); | $C_{B-Y}(1);$ | 𝑌(1); | $C_{B-Y}(5);$ 𝑌(9); |
| $C_{B-Y}(9);$ | 𝑌(17); | $C_{B-Y}(13);$ | 𝑌(25); | $C_{B-Y}(2);$ 𝑌(2); |
| $C_{B-Y}(6);$ | 𝑌(10); | $C_{B-Y}(10);$ | 𝑌(18); | $C_{B-Y}(14);$ 𝑌(26); |
| $C_{B-Y}(3);$ | 𝑌(3); | $C_{B-Y}(7);$ | 𝑌(11); | $C_{B-Y}(11);$ 𝑌(19); |
| $C_{B-Y}(15);$ | 𝑌(27); | $C_{R-Y}(0);$ | 𝑌(4); | $C_{R-Y}(4);$ 𝑌(12); |
| $C_{R-Y}(8);$ | 𝑌(20); | $C_{R-Y}(12);$ | 𝑌(28); | $C_{R-Y}(1);$ 𝑌(5); |
| $C_{R-Y}(5);$ | 𝑌(13); | $C_{R-Y}(9);$ | 𝑌(21); | $C_{R-Y}(13);$ 𝑌(29); |
| $C_{R-Y}(2);$ | 𝑌(6); | $C_{R-Y}(6);$ | 𝑌(14); | $C_{R-Y}(10);$ 𝑌(22); |
| $C_{R-Y}(14);$ | 𝑌(30); | $C_{R-Y}(3);$ | 𝑌(7); | $C_{R-Y}(7);$ 𝑌(15); |
| $C_{R-Y}(11);$ | 𝑌(23); | $C_{R-Y}(15);$ | 𝑌(31) | |

It may be seen that in this illustrative embodiment, and not by way of limitation, the blue color difference dct coefficients ($C_{B-Y}(k)$; k=0, 1, ..., 15 for one block B(m, n) are multiplexed with the first coefficients of the luminance dct coefficients 𝑌(k); k=0, 1, ..., 15 until the coefficients in the blue color component dct block are exhausted (meaning until they are all used or otherwise accounted for) then the red color component dct block coefficients $C_{R-Y}(k)$; k=0, 1, ..., 15 are multiplexed with the remaining luminance component dct coefficients 𝑌(k); k=16, 17, ..., 31 of the block until all (meaning luminance and both chrominance) components of the block are exhausted. The entire process iterates and repeats itself until all of the blocks which comprise a field of the video image are dct transformed and multiplexed.

The data stream represented in equation (22) by the thusly multiplexed dct coefficients (𝑌 and $C_h$) is extended from multiplexer 520 over cable 525 to a pair of dct-to-visibility ordering converter store memories 540 and 542, which alternately either (a) receive the multiplexed dct coefficients (𝑌 and $C_h$) over cable 525 and write the multiplexed dct coefficients (𝑌 and $C_h$) in a respective memory 540 or 542 to form a third color component dct coefficient data set DS or (b) read the visibility ordered dct coefficients of a color component data set DS from a respective memory and transmit the color component data set DS of dct coefficients as a data stream of visibility ordered color component multiplexed dct coefficient data sets over cable 235 onward to quantizer 240.

Before we describe the operation of the visibility ordering memory apparatus illustrated in FIG. 5 we provide a more specific description of some functions performed by visibility ordering memory 500. Recall that visibility ordering memory 500 not only multiplexes the luminance and chrominance dct coefficients (𝑌 and $C_h$) of a group of transformed image blocks (versus the dct coefficients of a single transformed image block) but also uses a visibility measure to rank order the luminance (Y) and chrominance (both the R-Y and B-Y) dct coefficients (𝑌 and $C_h$) from largest visibility coefficient to smallest visibility coefficient. It can alternatively be stated that visibility ordering memory 500 rank orders the dct coefficients (𝑌 and $C_h$) from the most important in terms of their visual significance to a reconstructed image to the least important in terms of its visual significance to the reconstructed image.

The converter stores 540, 542 would store a color component data set of dct coefficients of third data set array DS—meaning one luminance data set comprising 15 luminance (Y) blocks of dct coefficients 𝑌, one (B-Y) data set comprising 15 (B-Y) chrominance blocks of dct coefficients ($C_{B-Y}$) and one (R-Y) data set comprising 15 (R-Y) chrominance blocks of dct coefficients ($C_{R-Y}$). Therefore visibility ordering memory 500 receives the multiplexed luminance and chrominance image blocks of dct coefficients (𝑌 and $C_h$) on cable 525 from multiplexer 520, structures the image blocks of dct coefficients into data sets of dct coefficients, and supplies visibility ordered data sets of dct coefficients on cable 235. Although other visibility orderings are possible, expression (23) below evidences one illustrative sequential visibility ordering of the 32 dct coefficients 𝑌 of the luminance component (Y) as well as the 16 dct coefficients ($C_h$) for each of the two chrominance components (B-Y), (R-Y) of the image signal. To assist in understanding expression (23) below, recall that each dct coefficient shown in equation (23) is really a data set of that coefficient—meaning that, although equation (23) is shown in two-dimensions, it really is in three-dimensional space where the third dimension may be considered to be normal, or perpendicular, to the left-to-right flow of equation (23). The third dimension, or depth, includes a data set of dct coefficients (here 15 coefficients) corresponding to the blocks which comprise the data set. We will further clarify this point a little later on in this description.

Consider DS(0, 0). There is a DS(0, 0) for luminance component Y and a DS(0, 0) for each of the two chrominance components of the image signal. From equation (14), it is known that each DS(0, 0) comprises 15 image blocks B(0, 0); B(0, 1); ... ; B(0, 14). From equation (8), it is also known that each luminance block B(m, n) of each DS(0, 0) comprises 32 pixels P(i, j) or Y(k) and that each chrominance block B(m, n) of each DS(0, 0) comprises 16 pixels P(i, j) or $C_{R-Y}(k)$ or $C_{B-Y}(k)$. The visibility ordering memory orders the dct transform coefficients from the fifteen blocks of each component into a grouping (for example, into a frequency ordered grouping) of coefficients in descending order of visual importance in the reconstructed image.

In this example, the grouping can be by data set as already mentioned and can be such that each data set comprises 15 blocks of data, each block being similar to the pixel blocks shown in equations (2), (3), and (4) but with the pixels P(i, j) being replaced with dct coefficients ($\Psi(k)$, $\zeta_{B-Y}(k)$ or $\zeta_{R-Y}(k)$). Since there are 15 blocks in a data set, there are 15 of the (0, 0) luminance terms $\Psi(0)$, one such term for each block in the data set, etc. Visibility ordering memory 500 provides therefore 15 (0, 0) luminance dct coefficients $\Psi(0)$, one for each block of a first luminance data set; followed by 15 (0, 0) B-Y chrominance dct coefficients, one for each block of a chrominance data set; then 15 (0, 0) R-Y chrominance dct coefficients $\zeta_{B-Y}(0)$; then 15 (0, 1) $\Psi(1)$ terms; then 15 B-Y (0, 1) coefficients $\zeta_{B-Y}$, also known as $\zeta_{B-Y}(1)$; 15 R-Y (0, 1) coefficients $\zeta_{R-Y}$, also known as $\zeta_{R-Y}(1)$; 15 (1, 0) $\Psi$ terms, also known as $\Psi(8)$, et cetera. The net result is that data set groupings of 15 of each of the dct coefficients ($\Psi$ or $\zeta_h$) are transmitted sequentially before the next data set grouping of 15 dct coefficients is transmitted on cable 235.

The following represents one such visibility ordering of the dct coefficients, recognizing that for each dct coefficient noted below there is a data set of such dct coefficients transmitted in a sequence before any of the next dct coefficient is transmitted, i.e. the 15 $\Psi(0)$ dct coefficients of a data set are transmitted followed by the 15 $\zeta_{B-Y}(0)$ dct coefficients of the data set followed by the 15 $\zeta_{R-Y}(0)$ dct coefficients of the data set followed by the 15 $\Psi(1)$ dct coefficients of the data set et cetera:

$$\begin{array}{llllllll}
\Psi(0); & \zeta_{B-Y}(0); & \zeta_{R-Y}(0); & \Psi(1); & \zeta_{B-Y}(1); & \Psi(2); & \zeta_{R-Y}(1); \\
\Psi(8); & \zeta_{B-Y}(4); & \Psi(9); & \zeta_{R-Y}(4); & \Psi(3); & \zeta_{B-Y}(2); & \Psi(4); \\
\zeta_{R-Y}(2); & \Psi(16); & \zeta_{B-Y}(8); & \Psi(10); & \zeta_{R-Y}(8); & \Psi(11); & \zeta_{B-Y}(5); \\
\Psi(5); & \zeta_{R-Y}(5); & \Psi(17); & \Psi(24); & \Psi(6); & \Psi(12); & \Psi(18); \\
\Psi(25); & \zeta_{B-Y}(6); & \Psi(7); & \zeta_{R-Y}(6); & \Psi(13); & \zeta_{B-Y}(3); & \Psi(19); \\
\zeta_{R-Y}(3); & \Psi(26); & \zeta_{B-Y}(12); & \Psi(14); & \zeta_{R-Y}(12); & \Psi(20); & \zeta_{B-Y}(9); \\
\Psi(27); & \zeta_{R-Y}(9); & \Psi(21); & \zeta_{B-Y}(13); & \Psi(15); & \zeta_{R-Y}(13); & \Psi(28); \\
\zeta_{B-Y}(10); & \Psi(22); & \zeta_{R-Y}(10); & \Psi(29); & \zeta_{B-Y}(7); & \Psi(23); & \zeta_{R-Y}(7); \\
\Psi(30); & \zeta_{B-Y}(14); & \Psi(31); & \zeta_{R-Y}(14); & \zeta_{B-Y}(11); & \zeta_{R-Y}(11); & \zeta_{B-Y}(15); \\
\zeta_{R-Y}(15) & & & & & & \\
\end{array} \quad (23)$$

It should be clear that there are a total of 64 dct coefficients in the above example: 32 luminance dct coefficients $\Psi(k)$; k=0, 1, ..., 31 and 16 dct coefficients for each of the two color difference components of the image signal $\zeta_{B-Y}(k)$ and $\zeta_{R-Y}(k)$; k=0, 1, ..., 15. It should also be clear that there is a data set comprising 15 blocks (and hence, depth-wise, 15 dct coefficients) for each coefficient in the above example of equation (23), i.e. equation (23) has a depth for each dct coefficient where the depth represents the number of blocks in the data set, here 15). Stated alternatively, equation (23) illustrates the dct coefficient for a group of one luminance (Y) block and two chrominance blocks (R-Y) and (B-Y) whereas there are depth-wise 15 such groups and equation (23) illustrates a "slice" taken through the data set.

Recall further that a purpose of the visibility ordering of the transformed data sets is to enable a reconstruction of the entire group of blocks which comprise a data set even when only an incomplete, or partial, portion of the data set is recovered in a snatch from, for example, magnetic tape when operated in a picture-in-shuttle mode. Even further, in the picture-in-shuttle mode, there is a tradeoff between, on the one hand, the frequency with which a frame buffer, into which is stored the image which is played back from the tape, is updated and, on the other hand, the sharpness or visual clarity of the "updated blocks" which comprise the image. That is, during a picture-in-shuttle mode, parts of a video frame are updated with image blocks retrieved from the tape at various points in time. As a result, the reconstructed image comprises both old image blocks which are waiting to be updated by newer information from the tape as well as new image blocks which are read from the tape.

In view of the above, it is unfortunate that, if groups of image blocks are stored on the magnetic tape in the same order in which they emerge from dct circuit 220-1 or 220-2 and if a snatch of information is read from the tape, then there will be a relatively small number of perfectly reconstructed image blocks. At high speeds, the number will be generally so small that relatively large amounts of tape will be read between snatches, which makes it difficult to isolate a specific section of the tape where the editing is to occur, for example, a specific position representing a visual display scene, which is to be edited.

One advantage of our approach is that when the data are ordered by a visibility measure such as by the frequency of dct coefficients, then a color component data set of image blocks can be read at each snatch, which allows for a more frequent reconstruction of the image from some but not necessarily all the dct coefficients which comprise the image. Even though the resulting reconstructed image may be of a lower quality, for example, it could be devoid of fine detail and possibly even be noisy, it may still be of sufficient quality to serve the purposes of a person who when operating the tape in a picture-in-shuttle mode is desirous of quickly locating the section of tape where the edit is to be done.

Now let us turn to a further detailed description of the apparatus of FIG. 5. In the illustrative embodiment that is there described, converter store memories 540 and 542 are alternately switched between each other at a rate proportional to:

$$\frac{F_C}{N_Y M_Y K_Y + 2 N_C M_C K_C} \quad (24)$$

where $N_Y$ is the number of columns per luminance image block (in our example $N_Y=8$); $M_Y$ is the number of rows per luminance image block (in our example $M_Y=4$); $K_Y$ is the number of luminance image blocks per data set (in our example $K_Y=15$); $N_C$ is the number of columns per chrominance image block (in our example $N_C=4$); $M_C$ is the number of rows per chrominance image block (in our example $M_C=4$); $K_C$ is the number of color difference dct coefficient blocks of each type per data set (in our example $K_C=16$); and $F_C$ is the coefficient clock frequency (in our example $F_C=27.0$ million samples per second).

The switching between converter stores 540 and 542 occurs to store and recover alternate data sets of blocks of 15 dct coefficients, there being 15 image blocks in a luminance component (Y) data set and 15 image blocks in the data sets for each of the chrominance video data components (R-Y) and (B-Y). To this end, in the alternative embodiment now to be further described, the digitized input of dct transformed luminance image data on cable 225-1 and the dct transformed color difference image data (comprising alternating blocks of first B-Y then R-Y dct coefficients) is presented to the multiplexer 520. Each of the input streams on respective cables 225-1 and 225-2 has a coefficient data rate of about 13.5 million words per second (Mwords/sec) in CCIR-601. (Commonly, a word could comprise 12 bits.) The multiplexer 520 alternately selects a luminance dct coefficient then a chrominance dct coefficient throughout the active video period in accordance with multiplexed structure illustrated in equation (23). The output rate of the multiplexer 520 is therefore about 27 Mwords/sec. The multiplexed dct coefficient stream of image data is supplied on cable 525 and is presented to both of the dct-to-visibility ordering converter memories 540 and 542. Each of the memories 540 and 542 includes corresponding converter store memory locations for storing, in data set format, the dct coefficients ($\mathcal{Y}$ and $\mathcal{C}_h$) of the luminance (Y) component and of the chrominance components of the image data. A timing generator 544 controls which of the two converter store memories is activated for reading, and which of the two converter store memories is activated for writing, at any instant in time in response to respective read and write signals on read/write (R/W) lines 546 and 547 and in response to respective enable signals on OE lines 548 and 549. As illustrated, R/W line 546 and OE line 548 are supplied to the memory 540 while R/W line 547 and OE line 549 are supplied to the memory 542. The R/W and OE control signals are inverted by an inverter 550 before being supplied to the memory 542 via lines 547 and 549, respectively. Thus one memory is being written with a data set of dct coefficients while the other is being read of a data set. After a data set is written or read, the writing and reading functional roles of the memories 540 and 542 are reversed. The timing generator 544 provides the memory control signals in response to vertical (V sync) and horizontal (H sync) blanking signals on a line 552 supplied from a system control (not shown) to the timing generator 544.

In accordance with the principles of our invention, the memories 540 and 542, whose functional roles alternate, are used to continuously receive and to store the dct transformed image data which is a one-to-one multiplex of transformed luminance image blocks with transformed chrominance image blocks, and to then continuously supply the image data in visibility ordered data set format on a data set basis, i.e. on a 15 dct block group basis. To this end, on the one hand, write address generator 554 provides a first memory with a write address while, on the other hand, read address generator 556 provides a second memory with a read address. After a data set of dct coefficients is written into the first memory and after a data set of dct coefficients is read from the second memory, a data set may be read from the first memory and a data set may be written into the second memory. Specifically, the write (554) and read (556) address generators receive reset signals from the timing generator 544 via lines 558 and 560, respectively, in response to V sync and H sync signals, respectively, which are input to timing generator 544 over line 552. In response to the respective reset signals, the address generators 554, 556 alternately supply either a write or a read address signal to the respective one of the memories 540, 542.

An address output of the write address generator 554 is supplied over a bus 562 to the A and B inputs, respectively, of a pair of multiplexers 564 and 566, respectively, associated with the memories 540 and 542, respectively. In response to a write address output of the write address generator 554, the respective multiplexer 564 or 566 loads the dct coefficient data into the respective memory 540 or 542 in the order in which the dct coefficients emerge from the multiplexer circuit 520 namely, in an interleaved transposed image block scan sequential format. That is, the dct coefficients arrive as a multiplex of luminance $\mathcal{Y}$ and chrominance $\mathcal{C}_h$ dct coefficients and with the dct coefficients in raster scan by columns of the dct coefficient luminance $\mathcal{Y}$ matrix:

$$\mathcal{Y} = \begin{bmatrix} \mathcal{Y}(0) & \mathcal{Y}(1) & \mathcal{Y}(2) & \mathcal{Y}(3) & \mathcal{Y}(4) & \mathcal{Y}(5) & \mathcal{Y}(6) & \mathcal{Y}(7) \\ \mathcal{Y}(8) & \mathcal{Y}(9) & \mathcal{Y}(10) & \mathcal{Y}(11) & \mathcal{Y}(12) & \mathcal{Y}(13) & \mathcal{Y}(14) & \mathcal{Y}(15) \\ \mathcal{Y}(16) & \mathcal{Y}(17) & \mathcal{Y}(18) & \mathcal{Y}(19) & \mathcal{Y}(20) & \mathcal{Y}(21) & \mathcal{Y}(22) & \mathcal{Y}(23) \\ \mathcal{Y}(24) & \mathcal{Y}(25) & \mathcal{Y}(26) & \mathcal{Y}(27) & \mathcal{Y}(28) & \mathcal{Y}(29) & \mathcal{Y}(30) & \mathcal{Y}(31) \end{bmatrix} \quad (25)$$

and chrominance $\mathcal{C}_h$ matrix:

$$\mathcal{C}_h = \begin{bmatrix} \mathcal{C}_h(0) & \mathcal{C}_h(1) & \mathcal{C}_h(2) & \mathcal{C}_h(3) \\ \mathcal{C}_h(4) & \mathcal{C}_h(5) & \mathcal{C}_h(6) & \mathcal{C}_h(7) \\ \mathcal{C}_h(8) & \mathcal{C}_h(9) & \mathcal{C}_h(10) & \mathcal{C}_h(11) \\ \mathcal{C}_h(12) & \mathcal{C}_h(13) & \mathcal{C}_h(14) & \mathcal{C}_h(15) \end{bmatrix} \quad (26)$$

Note that the difference between equations (8), (10) and equations (25), (26) is that equations (8), (10) relate to pixels as the elements of array whereas equations (25), (26) relate to dct coefficients as the elements of the arrays.

Now, if the dct coefficients in the luminance transform matrix $\mathcal{Y}$ of equation (25) are indexed as shown in equation (25), the dct coefficients will emerge from the respective dct circuit 220-1 in the order given by reading the dct matrix of equation (25) in raster scan order by column beginning with $\mathcal{Y}(0)$. Similarly, if the dct coefficients in the chrominance coefficient matrix $\mathcal{C}_h$ are indexed as shown in equation (26), the dct coefficients will emerge in raster scan order by column beginning with $\mathcal{C}_h(0)$. In the illustrative embodiment described here, we have assumed that the blue color difference dct transform coefficients occur, or are multiplexed, before the red color difference dct transform coefficients. Clearly that is by way of illustration only and not by way of limitation. The red color difference dct transform coefficients could just as easily occur, or be multiplexed, before the blue color difference dct transform coefficients. For illustration purposes, the entire matrix of blue color difference dct transform coefficients (i.e., all 16 such dct coefficients) will emerge followed by the entire matrix of identically ordered red color difference dct transform coefficients (i.e., all 16 such dct coefficients).

After multiplexing, the order presented to the visibility ordering memory is merely the interleave of the two coefficient streams, a sample of which is given in equation (27):

$$
\begin{aligned}
&Y(0); \quad C_{B\text{-}Y}(0); \quad Y(8); \quad C_{B\text{-}Y}(4); \quad Y(16); \quad C_{B\text{-}Y}(8);\\
&Y(24); \quad C_{B\text{-}Y}(12); \quad Y(1); \quad C_{B\text{-}Y}(1); \quad Y(9); \quad C_{B\text{-}Y}(5);\\
&Y(17); \quad C_{B\text{-}Y}(9); \quad Y(25); \quad C_{B\text{-}Y}(13); \quad Y(2); \quad C_{B\text{-}Y}(2);\\
&Y(10); \quad C_{B\text{-}Y}(6); \quad Y(18); \quad C_{B\text{-}Y}(10); \quad Y(26); \quad C_{B\text{-}Y}(14);\\
&Y(3); \quad C_{B\text{-}Y}(3); \quad Y(11); \quad C_{B\text{-}Y}(7); \quad Y(19); \quad C_{B\text{-}Y}(11);\\
&Y(27); \quad C_{B\text{-}Y}(15); \quad Y(4); \quad C_{R\text{-}Y}(0); \quad Y(12); \quad C_{R\text{-}Y}(4);\\
&Y(20); \quad C_{R\text{-}Y}(8); \quad Y(28); \quad C_{R\text{-}Y}(12); \quad Y(5); \quad C_{R\text{-}Y}(1);\\
&Y(13); \quad C_{R\text{-}Y}(5); \quad Y(21); \quad C_{R\text{-}Y}(9); \quad Y(29); \quad C_{R\text{-}Y}(13);\\
&Y(6); \quad C_{R\text{-}Y}(2); \quad Y(14); \quad C_{R\text{-}Y}(6); \quad Y(22); \quad C_{R\text{-}Y}(10);\\
&Y(30); \quad C_{R\text{-}Y}(14); \quad Y(7); \quad C_{R\text{-}Y}(3); \quad Y(15); \quad C_{R\text{-}Y}(7);\\
&Y(23); \quad C_{R\text{-}Y}(11); \quad Y(31); \quad C_{R\text{-}Y}(15)
\end{aligned} \quad (27)
$$

The read addresses initiated by the timing generator 544 and supplied by the read address generator 556 are similarly directed to the B and A inputs, respectively, of the multiplexers 564 and 566, respectively, via a bus 568. The read addresses correspond to the memory locations as determined by the dct transform image block size, by the data set size and by the visibility ordering sequence desired, for example, 4×8 luminance dct transform image blocks in diagonal zigzag scan order. More about this later in our discussion of equations (28), (29), and (30).

Multiplexer 564 supplies the respective read or write address signal, whichever is active at an instant in time, to the memory 540 via an address bus 570. Similarly, multiplexer 566 supplies the respective write or read address signal, whichever is active at an instant in time, to memory 542 via an address bus 572. Timing generator 544 controls the individual multiplexers to activate the read or write addresses in response to V sync and H sync, via buses 574 and 576 which are coupled to respective A/B inputs of the multiplexers 564, 566.

Read address generator 556 generates addresses such that the sequentially stored multiplexed transformed color component image data blocks of coefficients are read out of the memories 540, 542 in the requisite transformed color component data set visibility order which, in this example, is further shown in equation (23). For example, there are 720 samples in a line of the luminance component of the video, as is the case in the CCIR 601 component color television standard, and the multiplex of luminance transform block coefficients $Y(k)$ alternated with color difference component transform block coefficients $C_i(k)$ is stored in the sequence in which they are output from the multiplex circuit 520 in response to write address generator 554 beginning with the direct current coefficient of the first luminance block in location 0, i.e. Y(0). If a data set DS of dct coefficients comprising 15 blocks is to be read out from memory, the read addresses for the dct coefficient data of the c=0 (zero) data set in the first block-row are 0, 64, 128, 192, ..., 896 for the first 15 luminance direct current terms of the first data set (there being eight columns in each image block); next, the direct current terms for the 15 (B-Y) dct coefficient blocks of the first data set row are read out from memory at addresses 1, 65, 129, 193, ... 897; followed by the direct current terms for the 15 (R-Y) dct coefficient blocks of the first data set are read out from memory at addresses 33, 97, 161, ... 929; et cetera. The equations for the memory location of a transformed component coefficient of a specified type is given below as equations (28), (29), and (30). Let k be the data set number of the image signal field in the range 0 through 365, let m be the block within the data set in the range from 0 through 14 and let $N_Y$ or $N_C$ be the coefficient index as defined in equation (24) above. Let $Y_L$ be the address of the luminance dct coefficient in memory. Let $C_B$ be the address of the blue color difference dct coefficient in memory. Let $C_R$ be the address of the red color difference dct coefficient in memory. Then if the order of multiplexing is as explained above, and the first memory location used is location 0, the addresses can be determined by the following three equations:

$$Y_L = 64m + 2*\text{floor}(N_Y/8) + 8*(N_Y \bmod 8) + 960*k \quad (28)$$

$$C_B = 1 + 64*m + 2*\text{floor}(N_C/4) + 8*(N_C \bmod 4) + 960*k \quad (29)$$

$$C_R = 33 + 64*m + 2*\text{floor}(N_C/4) + 8*(N_C \bmod 4) + 960*k \quad (30)$$

where
  floor means smallest integer, which is not larger than the argument within the parentheses
  mod means modulo
  m = 0, 1, ..., 14
  k = 0, 1, ..., 365
  $N_Y = 8$
  $N_C = 4$ The above three equations accurately identify the locations within memory 540, 542 of the dct transformed image coefficients on a field-by-field basis when one assumes that each coefficient address location holds one dct coefficient in word (usually 12 bits) of data The next visibility ordered color component transform data set is read from the other visibility ordering memory using the same memory location addresses. Using the visibility ordering of coefficients example given in equation (23) the addresses of the required coefficients may be computed using equations (28), (29), (30) above. For each coefficient given in equations (28), (29), (30) above, the index $N_y$ or $N_C$ is that given in the definition of equation (24), the index m is incremented over its range in the appropriate ones of equations (28), (29), (30). For example, if the component in question is the luminance component, then the equation for the luminance coefficient address is used with $N_Y$ in the equation taken equal to the index given in equation (24) for the coefficient to be read out of a memory 540, 542. These equations are derived based on the assumption that data from the multiplexer 520 is stored in sequential memory locations of memories 540, 542 beginning with location 0; that the color component dct transformed data block sizes are 4×8 for luminance, and 4×4 for chrominance, and that one data set comprises 15 blocks of each component type.

The sequence of memory addresses used to generate the desired visibility ordered dct coefficient stream at the output of the visibility ordering memory circuit 500 onto cable 235 is stored in the read address generator 556 in a memory as a read only memory element. A numerical sequence generator such as, a counter, is used to generate a sequence of numbers used to address the memory element to produce the address sequence for the visibility ordering memories 540 and 542.

The sequence of visibility ordering is derived from general principles of visual sensitivity taken together with the properties of the discrete cosine transform or other appropriate transform which must have the property of conversion of the input pixels to quantities which may be related to sensitivity of the human eye. It is also desirable that the decoding process may be performed on a subset of the complete data of the transform. It is further desirable that the terms retained for reconstruction of the low resolution shuttle picture require only a relatively small fraction of the total data storage space used to store the complete image data.

For example, the ordering given in equation (23) above was obtained by using the following rules:
  (a) The direct current component is the most important term for reconstruction of the image;
  (b) It is necessary to retain some low frequency color information to allow recognition of rapidly changing scenes from their color content;
  (c) The horizontal and vertical spatial frequency components of the transformed image are more important in recognizing an image than are the diagonal frequencies;
  (d) The low spatial frequency components of the transformed image are most important in reproducing a recognizable image;
  (e) Low spatial frequency diagonal components of the transformed image are more important in reconstruction of the image than are the highest frequency horizontal and vertical components; and
  (f) High spatial frequency chrominance terms are unimportant to reconstruction of an image for recognition of an image.

Using these rules it is clear that a number of different visibility orderings are possible. Since images vary in their spatial frequency content, and different observers tend to identify images using different criterion, the selection of a visibility ordering is not critical. Most important are the main rules outlined above. In generating the visibility ordering given in equation (23) there were frequencies which were equally important which had to be put in order in the sequence, in those cases the decision is arbitrary, and was selected at random.

By quick summary, it may be seen that in the example herein, the visibility ordering memory 500 within which the dct coefficient data are written stores the dct coefficient data in a sequential order corresponding to the location of the corresponding image block in the video image in response to the memory address locations provide by write address generator 554. Then the read address generator 556 provides the appropriate memory addresses for recovering the dct coefficient data, in response to the read addresses therein which are determined by the algorithm of equations (28), (29) and (30).

Figure 6:
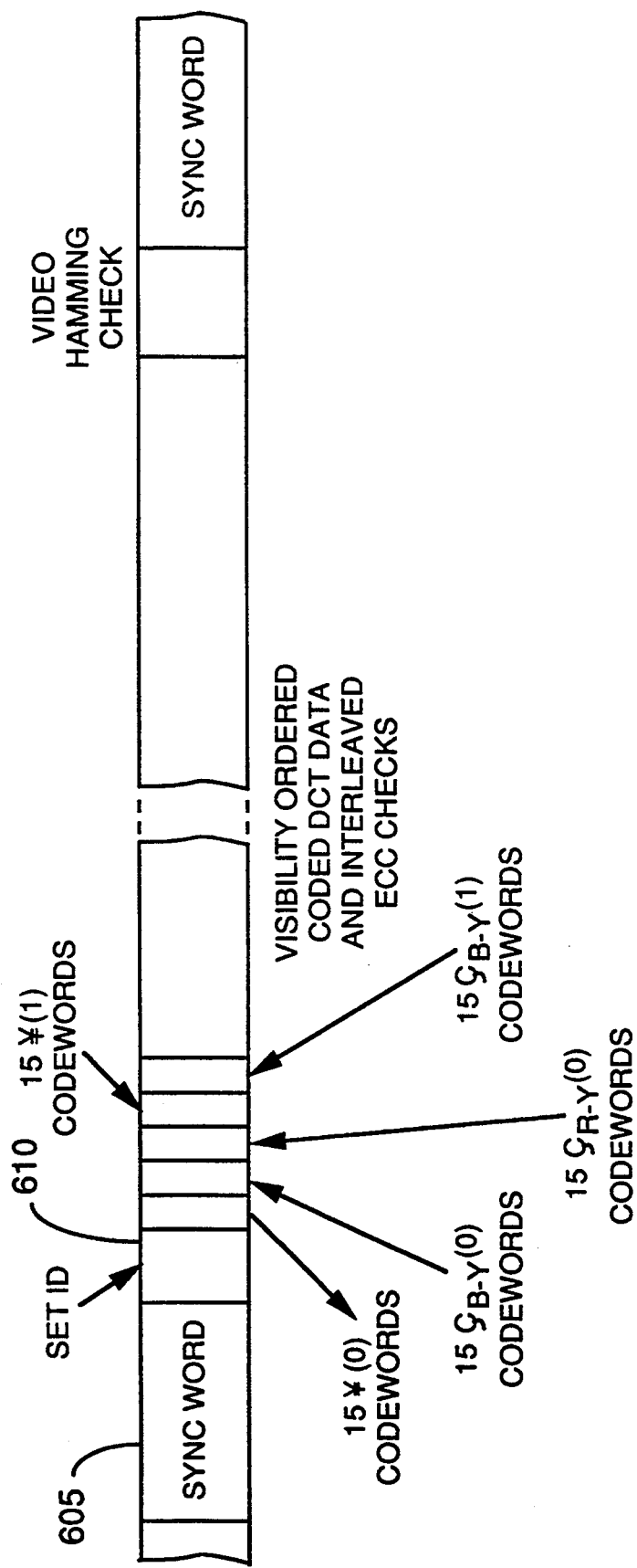
FIG. 6 illustrates one format for ordering data to be stored on a magnetic tape.

The formatter 260 combines the frequency ordered, quantized, entropy coded dct coefficients for one data set (comprising of 15 dct transform coefficient blocks of $Y$, $C_{R-Y}$, $C_{B-Y}$ coefficients in visibility order) with a synchronizing word, a set identifier, and error correction codewords. The format of the recorded data is shown in FIG. 6. Assuming the communications medium to which the blocks are provided is magnetic tape, the synchronizing word is placed at the beginning of each recorded data block on tape. A data block is comprised of one data set of compressed image data plus overhead information as previously mentioned. In order to reconstruct the image from the data sets it comprises, each data set must be uniquely identifiable, so that the image blocks which make up the data set may eventually placed in the correct location in the reconstructed image. That is the purpose of the set identifier which is included in each recorded data block. In picture-in-shuttle mode, a snatch of data may include one or more complete recorded data blocks, and partial data blocks. Complete data blocks may be recovered, deformatted, and decoded to produce a set of 15 complete image blocks. Partial recovered data blocks may be deformatted, and decoded to produce image blocks which lack the less visible image components, but which still are useful in reconstructing the picture in shuttle. The error correction system is used in error detection mode to determine the location in the partial data block where the data is in error, (i.e. where the "good" data ends). Data after the end of the error free area, is flagged as bad, and the data are set to zero, which is decoded to zero by the Huffman decoder. The end result is that dct coefficients which would have been in error are set to zero. Since the data which is recovered is in visibility order from the beginning of the set identifier, the most visually useful data will be recovered with the highest likelihood from an incomplete data block. Thus, at high shuttle speeds where a significant proportion of the data blocks recovered from tape are incomplete, the frequency ordering provides a method of extracting a maximum amount of useful image information.

In further summary, the image data are formed into blocks in a sequence which is predetermined based on the type of channel through which the compressed data will be transmitted. By way of example only, the blocks may be formed into a sequence which gives certain properties to groups of 15 blocks of each component of the CCIR-601 color signal taken from the same general area or location in the image. The block size for the dct transform of a luminance component is $4 \times 8$. The block size for the dct transform of the chrominance components is $4 \times 4$. The groups of 15 blocks of each component are termed data sets. The data sets are transformed by a two separate discrete cosine transform circuits. The luminance is transformed by one circuit and the chrominance is transformed by the other. The outputs of the two respective dct circuits are multiplexed together into a single data stream. The data stream is fed via a 12 bit bus to the visibility (or illustratively only a frequency) ordering memory 500. The frequency ordering memory orders the transform coefficients from the fifteen blocks of each component into a grouping (frequency ordered data set) of dct coefficients in descending order of visual importance in the reconstructed image. By way of example only, the grouping would first have 15 of the (0, 0) luminance terms followed by 15 of the B-Y (0, 0) terms then 15 R-Y (0, 0) terms; 15 (0, 1) Y terms; 15 (0, 1) B-Y terms; 15 (0, 1) R-Y terms; 15 (1, 0) Y terms; etc. See equations (23) or (26) for grouping examples. The purpose of frequency ordering the transformed data sets is to enable reconstruction of the entire group of blocks which comprise the data set even when only an incomplete portion of the data set is recovered from tape in picture in shuttle mode.

An additional benefit of visibility ordering of the dct coefficients of the transformed image data occurs in cases of overflow, when the quantizer selected to compress the dct coefficient data is not large enough, and an excess of data is produced which does not fit in the space allotted in the format for storage. In this case, the data which will be cut off, if the overflow is not excessive, will consist of the visually less important information, and the image most likely will not be noticeably impaired. To maximize the effectiveness of the overflow protection feature, it is better to generate each data set from a large number of transformed image blocks. This also helps in the case of picture in shuttle, allowing large areas of the image to be updated when a snatch of data is recovered. There is a limit to the utility of large data sets for picture in shuttle. The size of the shortest data snatch recovered at the highest shuttle speed at which a shuttle picture is required, determines the maximum size of the data set. The number of blocks comprising the data set is selected so that, the average length of the entropy coded coefficients used in reconstructing an image portion corresponding to the data set, is shorter in length than the snatch of coded image data recovered at the highest shuttle speed at which an image is required. In practice, a data snatch contains formatting and synchronizing information, so that the image data portion corresponding to the recovered data is smaller than the recovered data snatch.

To further aid in obtaining a picture when the data snatches are extremely short, the direct current dct coefficients, which are not entropy coded, may be stored with the most significant bits at the beginning of the data set, and the least significant bits later in the data stream. In this way, when a shuttle image is required which will, in general have reduced fidelity, the direct current coefficient most significant bits and a few high visibility terms may be used to reconstruct the image corresponding to the recovered data set. Using only say, the six or seven most significant bits of the direct current coefficients will result in a significantly shorter data stream necessary for reconstructing the image which corresponds to the data set.

In picture in shuttle mode there is a tradeoff between the frequency with which the frame buffer which stores the playback image is updated, and the sharpness of the updated blocks which make up the image. That is, during picture in shuttle, parts of the same frame are updated with blocks retrieved from tape at various times. Therefore, the shuttle picture is composed of groups of old blocks which are waiting to be updated with more recent information from tape, and new blocks just recovered from tape.

If groups of blocks are stored on tape in the order in which they emerge from the dct circuit, then for a given partial recovery of data from tape there will be a small number of perfectly reconstructed blocks. If, however, the data for a number of blocks is frequency ordered, then the entire group of blocks may be reconstructed although at a lower quality, i.e. it may be devoid of fine detail and may possibly be noisy.

The dct coefficients which result when a 4×8 block of luminance pixels are input to the Model STV 3200 discrete cosine transform circuit supplied by Thomson CSF as the transpose of the expected 4×8 array of coefficients. The coefficients come out of the circuit column-wise e.g. if the pixel order is raster scan by row: 0, 0; 0, 1; 0, 2; . . . then the frequency terms emerge raster scan by column: 0, 0; 1, 0; 2, 0; . . . .

The dct coefficients are stored into sequential memory locations in the same order in which they are received from the dct circuit. For a data set consisting of 15 blocks of luminance 4×8 in size the correspondence between memory locations, M; block, b; and coefficient (i, j) is in the following order M(b, i, j): 0(0, 0, 0) 1(0, 1, 0) 2(0, 2, 0) . . . 4(0, 0, 1) . . . 8(0, 0, 2) . . . 32(1, 0, 0) 33(1, 1, 0) . . . 448(14, 0, 0) . . . 479(14, 3, 7).

The dct coefficients are read out of memory in groups of 15 of the same two dimensional spatial frequency components following the overall ordering which puts low two dimensional spatial frequencies at the beginning of the output stream and higher frequencies toward the end. For example, the first coefficients read out are (0, 0, 0) (1, 0, 0) (2, 0, 0) (3, 0, 0) . . . (14, 0, 0) (0, 0, 1) (1, 0, 1) . . . (14, 0, 1) . These are the direct current terms of the first 15 blocks to enter the visibility ordering memory. The next group of 15 coefficients in order of visibility are the (b, 0, 1) coefficients. This process continues until all of the coefficients for all 15 dct blocks have been read out.

With the reading out of the last coefficient of the last dct block from the first memory, the roles of the memory banks are reversed: the incoming coefficients from the dct circuit are routed to the first memory, and the visibility ordered data sets are read from the second memory.

APPENDIX A

C Language Program Implementation of Some Aspects of FIG. 2

/* this program implements huffman code which uses end of frequency code
in place of run count if run extends to the end of the frequency term.
Bisection is used to select D from among equally spaced log D values.
If the selected value of D results in overflow, the overflow coefficients
are set to zero. The encoding of the data is performed in the same order
as the presently proposed format on tape. */ include <stdio.h>
include <math.h>
include <malloc.h>
define N 16

```c
FILE *fpin, *fpinr_y, *fpinb_y, *fpout, *fpoutr_y, *fpoutb_y, *fpout1;
double Dmax, Dmin, Dold, cr, lgcr;
double fbuf[23], rnd, Dpeak, sigmaD;
long nb, nbb, nbr, epsilon, maxbits;
short **lumabuf, **r_ybuf, **b_ybuf, **yb, **rb, **bb;
short buf[N][N], nn, mm, block, tranbits, round, wlen, vectors, lvf;
int exp1, mant, doneflag;
double lg2 = 0.693147181;

long countbitsy(double Dval, short vct1, double T1, short blkw, short **data);
long countbitsc(double Dval, short vct1, double T1, short blkw, short **data);
short **smatrix(short nrl,short nrh,short ncl,short nch);
double bisect(long codebits, double Dval, long mxbits);
double logquant(double inval, int expbits, int mantbits);
long encodebits(double Dval, short vct1, double T1, short blkw, short **data,
                short **pixbuffer, short ii, short jj, long bitct);
main (argc, argv)
short argc;
char *argv[];
{ double fabs(), temp, D;
    static double Dv;
    double incr, T, err, lgDval;
    char ext[5];   /* storage for extensions */
    short order, ordct, vectct, vectc, coeffct;
    short row, i, j, k, m, nrows, ncol, nblocks, vct;
    unsigned short Dshort;
    short accmult, itemp, itemp2, blockbits, itemp3, dvector[4];
    float datarate, raterr, errsqr, totalbiterr, yfract;
    long nbits, npixels, vectbits, colbits;
    long nbtotal, errbits, ysum;
    static short iy, jy, ic, jc;
    static long nb, nbb, nbr;

nblocks = 0; mm = 4; nn = 8;
    printf("transform accuracy in bits = ");
    scanf("%d", &tranbits);
```

```
wlen = tranbits;
tranbits = 14 - tranbits;
accmult = 1 << tranbits;
round = accmult >> 1;
printf("number of pixels per row = ");
scanf("%d", &ncol);
printf("nrows = ");
scanf("%d", &nrows);
printf("error tolerance epsilon (bits per transform set) = ");
scanf("%ld", &epsilon);
printf("initial D = ");
scanf("%lf", &Dv);
printf("ratio of maximum D to minimum D = ");
scanf("%lf", &Dpeak);
printf("bits in exponent of log D = ");
scanf("%d", &exp1);
printf("bits in mantissa of log D = ");
scanf("%d", &mant);
printf(" T = ");
scanf("%lf", &T);
printf("channel entropy bit/pel = ");
scanf("%f", &datarate);
maxbits = datarate *mm*(nn+2*mm)*23;  /*bits in 23 blox at datarate */
T *= accmult;
rnd = 0.5/ (1<<mant);
lgDval = log(Dv)/lg2;
lgDval = logquant(lgDval,exp1,mant);
Dv = pow(2.0, lgDval);    /* nearest qunatized value of D */
nbits = 0; npixels = 0; errsqr = 0; sigmaD = Dv; vectors = 0;
Dmin = Dv/Dpeak;
Dmax = Dv * Dpeak;
Dold = Dmax;
cr = 1.0/(float)(1<<mant);         /* log base 2 (common ratio) */
lgcr = cr*lg2;             /* ln(common ratio) */
cr = pow(2.0, cr); /* common ratio */
```

```c
if(argc < 4) {
    printf("usage: %s dct_file, dct_file, d-file\n", argv[0]);
    return;
}
openfile(argv[1], argv[2]); /*open dct input and output */
if ((fpout1 = fopen(argv[3], "w" )) == NULL)
{
    printf("cannot open %s\n", argv[3]);
    return;
} lumabuf = smatrix(0, mm -1, 0, ncol -1); /* alloc. luma inbuffer */
r_ybuf = smatrix(0, mm -1, 0, ncol/2 -1); /* alloc r-y inbuffer */
b_ybuf = smatrix(0, mm -1, 0, ncol/2 -1); /* alloc b-y inbuffer */
yb = smatrix(0, mm -1, 0, ncol -1); /*alloc luma outbuffer */
rb = smatrix(0, mm -1, 0, ncol/2 -1); /*alloc r-y outbuffer */
bb = smatrix(0, mm -1, 0, ncol/2 -1); /*alloc b-y outbuffer */ fprintf(fpout1, "image %s\n", argv[1]);
fprintf(fpout1, "Dv = %1.3lf\n", Dv);

fprintf(fpout1,"vectc\tD\trate err\tbits total\tbits color\ty\n");

for (row = 0; row < nrows; row += mm) {
    loadrow(ncol, mm); /* get a row of y, & chroma */
    for (vct = 0; vct < ncol; vct += 23 * nn)
    {
        do
        {

/* compute bits for the given value of D */
/*bits for luma */
            nb = countbitsy(Dv,vct,T,nn,lumabuf);
/* bits for r-y */
            nbr = countbitsc(Dv,vct/2,T,nn/2,r_ybuf);
/* bits for b-y */
            nbb = countbitsc(Dv,vct/2,T,nn/2,b_ybuf);
```

```
/*color vector bits*/        nbtotal = (nb + nbr + nbb);
                             vectct = vct/(23 * nn);
                             vectc = vectct + ((row/mm) * 4);
                             errbits = nbtotal - maxbits;
                             if(abs(errbits) <= epsilon)
                             {
/* this value ok */
                                 lvf = 0;
                                 goto encode1;
                             } raterr = (float)errbits/(23.0*mm*(nn+2*mm));
                             fprintf(fpout1,"%d\t%lf\t% 3.3lf\n", vectc,Dv,
raterr);
/* use bisection algorithm to estimate D value for this group of blocks */
/*compute next D value */    Dv = bisect(errbits, Dv, maxbits);
                             }
                             while(doneflag == 0);

/*encode image using computed D value */ encode1:            D = Dv;
                             Dshort = D * 512;    /*quantize to 16 bits */
                             D = (double)Dshort/512.0; /* use with sm422i2
prog. */ iy = 0; jy = 0; ic = 0; jc = 0; nbtotal = 0; ysum = 0;
/* luma dc */       nb = encodebits(D,vct,T,nn,lumabuf,yb,0,0,nbtotal);
                             nbtotal += nb;
                             ysum += nb;
/*blue dc */        nbb =encodebits(D,vct/2,T,nn/2,b_ybuf,bb,0,0,nbtotal);
                             nbtotal += nbb;
/*red dc */         nbr
=encodebits(D,vct/2,T,nn/2,r_ybuf,rb,0,0,nbtotal);
                             nbtotal += nbr;
                             nextijy(&iy, &jy);
```

```c
/*luma ac1 */            nb = encodebits(D,vct,T,nn,lumabuf,yb,iy,jy,nbr);
                         nbtotal += nb;
                         ysum += nb;

for(coeffct = 1; coeffct <= mm*nn/2-1; ++coeffct)
                         {
                                 nextijy(&iy, &jy);
/*enc 2 luma coeff vect */    nb =
encodebits(D,vct,T,nn,lumabuf,yb,iy,jy,nbtotal);
                                 ysum += nb;
                                 nbtotal += nb;
                                 nextijy(&iy, &jy);
                                 nb =
encodebits(D,vct,T,nn,lumabuf,yb,iy,jy,nbtotal);
                                 ysum += nb;
                                 nbtotal += nb;
                                 nextij(&ic, &jc, nn/2);
/*enc blue vect of coeff */   nbb =
encodebits(D,vct/2,T,nn/2,b_ybuf,bb,ic,jc,nbtotal);
                                 nbtotal += nbb;
/*enc red vect of coeff */    nbr =
encodebits(D,vct/2,T,nn/2,r_ybuf,rb,ic,jc,nbtotal);
                                 nbtotal += nbr;
                         }

/* total bits vect */   vectbits = nbtotal;
/* % of bits for y */   yfract =(float)ysum/(float)vectbits;
                         yfract *= 100.0;
                         dvector[vectct] = Dshort;
/* rate error*/          raterr = (float)(vectbits - maxbits)/(23.0
                         * mm *(nn + 2*mm));
                         errsqr += raterr * raterr;
                   /* add bits for this vect to the total for image */
                         nbits += vectbits;
                         colbits = vectbits - ysum;
                         fprintf(fpout1, "%d\t%4.3lf\t%
```

```
                        4.3f\t\t%ld\t\t%ld\t\t%2.2f\n" ,vectc,D,raterr,vectbits,colbits,yfract);
                                        /* compute quantized lowpassed D */
                                        sigmaD =.90*sigmaD + .10*D;
                                        Dv = log(sigmaD)/lg2;
                                        Dv = logquant(Dv, exp1, mant);
                                        Dv = pow(2.0, Dv);
                                        Dmax = Dv*Dpeak;
                                        Dold = Dmax;
                                        doneflag = 0;
                                        Dmin = Dv/Dpeak;
                                        if(Dmin < 1.0)
                                                Dmin = 1.0;

}
                store_data(mm, ncol, yb, 1, fpout, dvector);
                store_data(mm, ncol/2, rb, 0, fpoutr_y, dvector);
                store_data(mm, ncol/2, bb, 0, fpoutb_y, dvector);
                printf("stored row %d\n", row);

}
        fprintf(fpout1, "squared error = %3.2f", errsqr);
        fclose(fpin);
        fclose(fpinr_y);
        fclose(fpinb_y);
        fclose(fpout1);
        fclose(fpout);
        fclose(fpoutr_y);
        fclose(fpoutb_y);
        fclose(fpout1);
        printf("Nbits = %ld\n", nbits);
} store_data(imax, col, pixelbuf, dstorflg, outfile, Dvect)
short imax, col, **pixelbuf, dstorflg;
short Dvect[];
FILE *outfile;
{
        short vect, i;
```

```c
                /* store D values followed by row of vectors */
                if (dstorflg)  /* only luma carries D values */
                {
                        for (vect = 0; vect < 4; ++vect)
                        {
/*D values for row */   putw(Dvect[vect],outfile);
                        }
                }
                for (i = 0; i < imax; ++i)
                {
                        fwrite(pixelbuf[i],col*2,1,outfile);
                }
} openfile(fname1, fname2)
char *fname1, *fname2;

{
        static char namebuf[30];

sprintf(namebuf, "%s.y", fname1);
        if ((fpin = fopen(namebuf, "rb" )) == NULL)
        {
                printf("cannot open %s\n", namebuf);
                return;
        }
        printf("%s opened\n", namebuf);

sprintf(namebuf, "%s.r-y", fname1);
        if ((fpinr_y = fopen(namebuf, "rb" )) == NULL)
        {
                printf("cannot open %s\n", namebuf);
                return;
        }
        printf("%s opened\n", namebuf);

sprintf(namebuf, "%s.b-y", fname1);
        if ((fpinb_y = fopen(namebuf, "rb" )) == NULL)
```

```c
        {
                printf("cannot open %s\n", namebuf);
                return;
        } printf("%s opened\n", namebuf);

sprintf(namebuf, "%s.y", fname2);
        if ((fpout = fopen(namebuf, "wb" )) == NULL)
        {
                printf("cannot open %s\n", namebuf);
                return;
        }
        printf("%s opened\n", namebuf);

sprintf(namebuf, "%s.r-y", fname2);
        if ((fpoutr_y = fopen(namebuf, "wb" )) == NULL)
        {
                printf("cannot open %s\n", namebuf);
                return;
        }
        printf("%s opened\n", namebuf);

sprintf(namebuf, "%s.b-y", fname2);
        if ((fpoutb_y = fopen(namebuf, "wb" )) == NULL)
        {
                printf("cannot open %s\n", namebuf);
                return;
        } printf("%s opened\n", namebuf);
} loadrow(incols, blrows)

short incols, blrows;

/* loads image components to corresponding row buffers */
```

```c
{
        short row;

for (row = 0; row < blrows; ++row)
        {
                fread(lumabuf[row], incols*2, 1, fpin);
                fread(r_ybuf[row], incols, 1, fpinr_y);
                fread(b_ybuf[row], incols, 1, fpinb_y);
        }
} nextij(ip, jp, blkwd)
short *ip, *jp, blkwd;
{
        static short iinc, jinc;
        short i, j;

i = *ip; j = *jp;
        if (i == 0 && j == 0) {
                iinc = -1; jinc = 1;
        }
        if (i == (mm-1) && j == (blkwd-1)) return(0);
        i += iinc; j += jinc;
        if (i >= mm) {
                i = mm - 1; j += 2;
                iinc = -1; jinc = 1;
        }
        if (j >= blkwd) {
                j = blkwd - 1; i += 2;
                jinc = -1; iinc = 1;
        }
        if (i < 0) {
                i = 0; iinc = 1; jinc = -1;
        }
        if (j < 0) {
                j = 0; iinc = -1; jinc = 1;
        }
```

```c
        *ip = i; *jp =j;
        return(1);
} nextijy(ip, jp)
short *ip, *jp;
{
        short i, j, index, nxtindex;
        static short coeff[32] = {1,2,3,8,5,10,7,12,9,4,11,16,13,18,15,20,17,
                6,19,24,21,26,23,28,25,14,27,22,29,30,31,0};
        /* coeff[] gives index of next coeff in zig-zag scan of 4x8 block */ i = *ip; j = *jp;
        index = 8*i + j;
        nxtindex = coeff[index];
        i = nxtindex/8;
        j = nxtindex%8;
        *ip = i; *jp =j;
} long countbitsy(Dval, vct1, T1, blkw, data)
double Dval, T1;
short vct1, blkw, **data;
{
        static short i, j, k, inrun, run, blockbits, m, isoone;
        static long vectbits;
        static double temp;
        long m1;
        static short ampl[12] = {1,3,4,5,5,6,7,7,8,8,8,8};
        static short runtbl[29] = {2,3,3,4,4,5,5,5,5,5,6,6,6,6,6,6,6,7,7,7,7,7,
                                    7,7,7,8,8,8,8};

i = 0; j = 0; run = 0; inrun = 0;
        vectbits = (15 - tranbits) * 23;  /* bits for dc terms */
        while (nextij(&i, &j, blkw))
        {
                blockbits = 0; /* clear vector bit count */
```

```
                    /* For each vector of 23 coefficients */
                    for (k = 0; k < 23 * blkw; k += blkw)
                    {
                            /* Copy freq vector into fbuf */
                            fbuf[k/blkw] = data[i][k + j + vct1];
                    }

/* Quantize */
                    k = 0;
encode:             while ( k < 23 * blkw)
                    {
                            temp = fbuf[k/blkw];

if (temp > 0) {
/* threshold sign depends on data sign */if (temp > T1) temp -= T1;
                                else temp = 0.0;
                            } else {
                                if (temp < -T1) temp += T1;
                                else temp = 0.0;
                            }
/*coarse quantize: divide by Dval */    m1 = temp / Dval;
/* with rounding */                         m1 += round;
/* transform accuracy = # of bits */    m = m1 >> tranbits;
/* alotted to quantized coefficient */  k += blkw;

/* Huffman code coeff. */
                            /* and zero runs */
                            if(m != 0)
                            {
                                    ++blockbits; /* 1 bit for sign
*/
                            }
                            if (m<0)   /* according to table */
                            {
                                    m = abs(m); /* now treat
coefficient
                                            as positive */
                            }
```

```
                                    if (inrun)  /* zero run in progress */
                                    {
                                      if (m==0)  /* another 0 in the run */
                                      {
                                      ++run;    /* incr. runlength; get */
                                      goto encode;  /* next coeff. value */
                                      }
                                      else
                                      {
                                      inrun = 0;           /* end of 0 run */
                                      if (run >28)  /* exceeds max tbl run
*/
                                      blockbits += 16;
                                      else  /* val. in run tbl. + 3 for prefix
*/
                                      blockbits += runtbl[run -1] + 3;
                                      run = 0; /* end of run, clr runctr*/
/* coeff val not in huff */         if (m > 12)
/* table, prefix + xform */             blockbits += (6 + wlen);
/* accuracy # of bits */            else
                                        blockbits += ampl[m-1]; /*encode
with tbl */
                                      goto encode; /* value and get next
coeff. */
                                      }

}
                                    else /* not in zero run */
                                    {
                                      if (m ==0)
                                      {
                                      inrun = 1; /* if coeff is 0; run starts*/
                                      ++run;  /* set run flag; start run
count */
                                      goto encode; /* get next coeff. */
                                      }
                                      else
                                      {
```

```
                    if (m>12)   /* coeff. val. not in huff. */
                    {
                    blockbits += (6 + wlen); /* tbl; use prefix +
                                                                    wlen bits */
                    goto encode;  /* bit value */
                    }
                    else
                    blockbits += ampl[m-1];
                    goto encode;
                    }
                }
            }
            /* done 1 block; if in zero run, just use end of
               block code to end run; if not in run: end of block
               not needed */
            if(inrun)
            {
               blockbits += 4;      /* end of block code */
            }
               vectbits += blockbits;  /* count bits in vector */ run = 0;                  /* clear run count */ inrun = 0;                /* clear run flag */

}
        return(vectbits);
    } long countbitsc(Dval, vct1, T1, blkw, data)
double Dval, T1;
short vct1, blkw, **data;
```

```
{
        static short i, j, k, inrun, run, blockbits, m, isoone;
        static long vectbits;
        static double temp;
        long m1;
        static short ampl[11] = {3,4,5,5,6,7,7,8,8,8,8};
        static short runtbl[23] = {1,2,3,5,6,6,7,7,8,8,8,8,8,9,9,9,9,9,9,9,
                                        10,10,10};
        /* run table modified to count runs up to 3 as single zeros */ i = 0; j = 0; run = 0; inrun = 0;
        vectbits = (15 - tranbits) * 23;  /* bits for dc terms */
        while (nextij(&i, &j, blkw))
        {
                blockbits = 0; /* clear vector bit count */
                /* For each vector of 23 coefficients */
                for (k = 0; k < 23 * blkw; k += blkw)
                {
                        /* Copy freq vector into fbuf */
                        fbuf[k/blkw] = data[i][k + j + vct1];
                }

/* Quantize */
                k = 0;
encode:         while ( k < 23 * blkw)
                {
                        temp = fbuf[k/blkw];

if (temp > 0) {
/* threshold sign depends on data sign */if (temp > T1) temp -= T1;
                                        else temp = 0.0;
                                } else {
                                        if (temp < -T1) temp += T1;
                                        else temp = 0.0;
                                }
/*coarse quantize: divide by Dval */    m1 = temp / Dval;
/* with rounding */                         m1 += round;
/* transform accuracy = # of bits */    m = m1 >> tranbits;
```

```
                                        k += blkw;
/* alotted to quantized coefficient */

/* Huffman code coeff. */
                                        /* and zero runs */
                                        if(m != 0)
                                        {
                                                ++blockbits; /* 1 bit for sign
*/
                                        }
                                        if (m<0)   /* according to table */
                                        {
                                                m = abs(m); /* now treat
coefficient
                                                                as positive */
                                        }
                                        if (inrun)   /* zero run in progress */
                                        {
                                          if (m==0)  /* another 0 in the run */
                                          {
                                          ++run;     /* incr. runlength; get */
                                          goto encode;  /* next coeff. value */
                                          }
                                          else
                                          {
                                          inrun = 0;              /* end of 0 run */
                                          if (run >23)   /* exceeds max tbl run
*/
                                          blockbits += 16;
                                          else  /* val. in run tbl. */
                                          blockbits += runtbl[run -1];
                                          run = 0; /* end of run, clr runctr*/
/* coeff val not in huff */       if (m > 11)
/* table, prefix + xform */             blockbits += (6 + wlen);
/* accuracy # of bits */      else
                                                blockbits += ampl[m-1]; /*encode
with tbl */
                                          goto encode; /* value and get next
``` coeff. */
            }
        }
        else /* not in zero run */
        {
            if (m ==0)
            {
                inrun = 1; /* if coeff is 0; run starts*/
                ++run;  /* set run flag; start run count */ goto encode; /* get next coeff. */
            }
            else
            {
                if (m>11)   /* coeff. val. not in huff. */
                {
                    blockbits += (6 + wlen);  /* tbl; use prefix + wlen bits */ goto encode; /* bit value */
                }
                else
                blockbits += ampl[m-1];
                goto encode;
            }
        }
    }
/* done 1 vector; if in zero run, just use end of block code to end run; if not in run: end of block not needed */
            if(inrun)
            {
                blockbits += 4;    /* end of block code */
            }
            vectbits += blockbits; /* count bits in vector */ run = 0;        /* clear run count */
            inrun = 0;      /* clear run flag */

```
                }
                return(vectbits);
        }
long encodebits(Dval, vct1, T1, blkw, data, pixbuffer, ii, jj, bitct)
double Dval, T1;
long bitct;
short vct1, blkw, **data, **pixbuffer, ii, jj;
{
        static short k, inrun, run, blockbits, isoone, m;
        static double temp;
        long m1;
        int crflg, i, j, oldbitct;
        static short ampl[23] = {1,3,4,5,5,6,7,7,8,8,8,8,3,4,5,5,6,7,7,8, 8,8,8};
        static short runtbl[52] = {5,6,6,7,7,8,8,8,8,8,9,9,9,9,9,9,9,10,10,
                10,10,10,10,10,10,11,11,11,11,1,2,3,5,6,6,7,7,8,8,8,8,8,
                        9,9,9,9,9,9,9,10,10,10};

crflg = 0;
        if (blkw == 4)
                crflg = 1; /* chroma is being coded */
        oldbitct = bitct;
        run = 0; inrun = 0;
        /* For each vector of 23 coefficients */
        for (k = 0; k < 23 * blkw; k += blkw)
        {
                /* Copy freq vector into fbuf */
                fbuf[k/blkw] = data[ii][k + jj + vct1];
        } k = 0;

encode: while (k < 23*blkw && bitct < maxbits)
        { if(!ii && !jj)
```

```
/* dc terms don't get Huffman coded */
    {
                    m = data[0][k + vct1];
                    m = m + round;
                    m >>= tranbits;
                    pixbuffer[0][k+vct1] = m;
                    bitct += (15 - tranbits);
                    k += blkw;
                    goto encode;
    }

/* Quantize ac terms */
    else
    {
                    temp = fbuf[k/blkw];
                    if (temp > 0) {
/* threshold sign depends on data sign */ if (temp > T1) temp -= T1;
                    else temp = 0.0;
                    } else {
                    if (temp < -T1) temp += T1;
                    else temp = 0.0;
                    }
/*coarse quantize: divide by Dval */    m1 = temp / Dval;
/* with rounding */                     m1 = m1 + round;
/* transform accuracy = # of bits */    m = (m1 >> tranbits);
/* alotted to quantized coefficient */  pixbuffer[ii][k + jj + vct1] = m;
/* store quant. value in buffer */      k += blkw;

/* Huffman code coeff. */
                    /* and zero runs */
                    if(m != 0)
                    {
                                    ++bitct; /* 1 bit for sign */
                    }
                    if (m<0)    /* according to table */
                    {
                                    m = abs(m);
```

```
/* now treat coefficient as positive */
                                    }
                                    if (inrun)  /* zero run in progress */
                                    {
                                      if (m==0)  /* another 0 in the run */
                                      {
                                      ++run;     /* incr. runlength; get */
                                      goto encode; /* next coeff. value */
                                      }
                                      else
                                      {
                                      inrun = 0;           /* end of 0 run */
                                      if (run >28)
                              /* exceeds max tbl run */
                                        bitct += 16;
                                      else
                              /* val. in run tbl.includes prefix */
                                        bitct += runtbl[run -1 + crflg*29] ;
                                        run = 0; /* end of run, clr runctr*/
/* coeff val not in huff */       if (m > 11)
                                      {
                                          if(crflg)
                              /* coding chroma */
/* table, prefix + xform */                bitct += (6 + wlen);
                                          else
                                            if(m > 12)
                                                bitct += (6 + wlen);
                                            else
                                                bitct += ampl[m-1+
                                                    crflg*12];
                                      }
/* accuracy # of bits */          else            /*encode with tbl */
                                      bitct += ampl[m-1+crflg*12];
                                      goto encode; /* and get next coeff. */
                                      }

}
                                    else /* not in zero run */
```

```
            {
              if (m ==0)
              {
                inrun = 1; /* if coeff is 0; run starts*/
                ++run;
/* set run flag; start run count */
                goto encode; /* get next coeff. */
              }
              else
              {
                if (m>11)
/* coeff. val. not in huff. */
                {
                        if(crflg)
                           bitct += (6 + wlen);
                        else
                           if(m>12)
                              bitct += (6 + wlen);
                           else
                              bitct += ampl[m-1+
                                   crflg*12];
                        goto encode;  /* bit value */
                }
                else
                bitct += ampl[m-1+crflg*12];
                goto encode;
              }
            }
         }
    }
    if (k < 23 * blkw)
    {
    /* overflow occured, clear overflowed coefficients */
            for(m = k; m<23*blkw; m+=blkw)
                 {
```

```
                                pixbuffer[ii][jj + m + vct1] = 0;
            }
        }
        else
        {
                /* done 1 frequency; if in zero run, just use
                end of frequency code to end run;
                if not in run: end of frequency
                 not needed */
            if(inrun)
            {
                bitct += 4;      /* end of block code */
                if(bitct > maxbits)
                        bitct -= 4; /* eof causes overflow */
            }
            run = 0;
        /* clear run count */
            inrun = 0;
        /* clear run flag */
        }
        return(bitct - oldbitct);
} double bisect(codebits, Dval, mxbits)
long codebits, mxbits;
double Dval;
{
        static long codeb[6];
        double interval;
        static double Dcurr;
        float sign;

Dcurr = Dval;
        if(lvf == 1)
```

```
{
        lvf = 0;
        doneflag = 1;
        /* last computed value for D gave bit err > epsilon */
        if(codebits > 0)
        {
                return(Dcurr);
        }
        else
        {
                /* too few bits; use next lower Dvalue */
                Dcurr /= cr;
                return(Dcurr);
        }
} if (codebits < 0)
        sign = -1;
else
        sign = 1;

interval = (int)(fabs(log(Dcurr/Dold)/lgcr) + .5);
interval = (int)(interval/2.0 +.5);
if (interval <= 1)    /* last bisection set flag */
        lvf = 1;
Dold = Dval;
Dval = Dcurr*pow(cr, sign*interval);
return(Dval);

} double logquant(inval, expbits, mantbits)
double inval;
```

```
int expbits, mantbits;
{
        int iinval, mantsh, expval, mantval;
        double outval;

mantsh = 1 << mantbits;   /* shift for mantissa */ outval = inval + rnd;    /* round */
        iinval = outval;              /* integer part; ie exponent */
        mantval = mantsh * (outval - (double)iinval);
                /* quantize mantissa */
        outval = (double)mantval/(double)mantsh;
                /* cnvt quant. val to dbl */
        outval = outval + (double)iinval;
                /* add exponent back to mantissa */
        return(outval);
} unsigned char **cmatrix(nrl,nrh,ncl,nch)
short nrl,nrh,ncl,nch;
{
        int i;
        unsigned char **m;

m=(unsigned char **) malloc((unsigned) (nrh-nrl+1)*sizeof(char*));
        if (!m) nrerror("allocation failure 1 in matrix()");
        m -= nrl;

for(i=nrl;i<=nrh;i++) {
                m[i]=(unsigned char *) malloc((unsigned) (nch-ncl+1)*
                        sizeof(unsigned char));
                if (!m[i]) nrerror("allocation failure 2 in cmatrix()");
                m[i] -= ncl;
```

```
        }
            return m;
} char *cvector(nl,nh)
short nl,nh;
{
        char *v;

v=(char *)malloc((unsigned) (nh-nl+1)*sizeof(char));
        if (!v) nrerror("allocation failure in cvector()");
        return v-nl;
} short **smatrix(nrl,nrh,ncl,nch)
short nrl,nrh,ncl,nch;
{
        short i,**m;

m=(short **)malloc((unsigned) (nrh-nrl+1)*sizeof(short*));
        if (!m) nrerror("allocation failure 1 in imatrix()");
        m -= nrl;

for(i=nrl;i<=nrh;i++) {
                m[i]=(short *)malloc((unsigned) (nch-ncl+1)*sizeof(short));
                if (!m[i]) nrerror("allocation failure 2 in imatrix()");
                m[i] -= ncl;
        }
        return m;
}
```

END OF APPENDIX A

Although the invention has been described as selecting and compressing data taken from spatial, that is, two-dimensional, locations on an image, it also is applicable to the compressing of data taken from spatio-temporal, or three-dimensional locations. For example, since there is redundancy in the temporal dimension, compression using the third dimension of time may be used, for example, in a three-dimensional discrete cosine transform (dct) process. In such a scheme, three-dimensional compression image blocks (cubes) would consist of a number of two-dimensional image blocks taken from the same locations within several frames of a multi-frame sequence. In this case, compressing may be performed by forming data sets from groups of three-dimensional cubes. Accordingly, while there have been shown and described above various alternative embodiments of compression and decompression and image locating and image reconstructing systems and methods of operation for the purpose of enabling a person of ordinary skill in the art to make and use the invention, it should be appreciated that the invention is not limited thereto. Accordingly, any modifications, variations or equivalent arrangements within the scope of the attached claims should be considered to be within the scope of the invention.

What is claimed is:

1. A method for compressing a digital image signal and for decompressing the compressed digital image signal, the method comprising the steps of:

receiving the image signal;

stratifying the received image signal into a plurality of image blocks, each image block being of predetermined size and each image block including image data from the image signal for defining a respective portion of the image signal;

transforming each respective image block of the image signal to obtain a respective transform coefficient block, a transform coefficient block including a plurality of transform coefficients, the respective transform coefficients of a transform coefficient block being usable for reconstructing the corresponding portion of the image signal;

structuring the plurality of transform coefficients of the transform coefficient block into a predetermined visibility order;

generating an ordered block of image transform coefficients from the visibility ordered transform coefficients;

providing the ordered block of transform coefficients to a communications medium as a segment of predetermined size;

retrieving at least a snatch from an ordered block of transform coefficients from the communications medium; and reconstructing a partial image signal from the snatch of retrieved transform coefficients.

2. The method of claim 1 further comprising the steps of:

quantizing each of the plurality of ordered transform coefficient blocks; and formatting each of the quantized plurality of ordered transform coefficient blocks into a segment of predetermined size.

3. The method of claim 1 further comprising the step of:

recording the ordered block of transform coefficients on a magnetic medium as a segment of predetermined size.

4. The method of claim 1 further comprising the step of:

transmitting the ordered block of transform coefficients on a communications medium as a segment of predetermined size.

5. The method of claim 1 wherein the structuring and generating steps comprise the steps of:

multiplexing a plurality of the transform coefficient blocks and rank ordering the transform coefficients of a transform coefficient block according to a visibility ordering measure.

6. The method of claim 5 wherein the rank ordering step comprises the step of:

rank ordering the transform coefficients of a transform coefficient block from a highest visibility measure to a lowest visibility measure.

7. The method of claim 6 wherein the rank ordering step comprise the step of:

rank ordering the transform coefficients of a transform coefficient block from a lowest frequency component to a highest frequency component.

8. The method of claim 1 wherein the transforming step comprises the step of:

transforming each respective image block using a discrete cosine transformation methodology.

9. The method of claim 8 wherein the structuring and generating steps comprise the step of:

rank ordering the dct transform coefficients of a dct transform coefficient block from lowest frequency component to highest frequency component.

10. The method of claim 8 wherein the structuring and generating steps comprise the steps of:

multiplexing a plurality of the dct transform coefficient blocks and rank ordering the dct transform coefficients of a dct transform coefficient block according to a visibility ordering measure.

11. The method of claim 10 wherein the rank ordering step comprises the step of:

rank ordering the dct transform coefficients of a dct transform coefficient block from a highest visibility measure to a lowest visibility measure.

12. The method of claim 11 wherein the rank ordering step comprise the step of:

rank ordering the dct transform coefficients of a dct transform coefficient block from lowest frequency component to highest frequency component.

13. A system for compressing a digital image signal and for decompressing the compressed digital image signal, the system comprising:

means for receiving the image signal;

means for stratifying the received image signal into a plurality of image blocks of predetermined size where each image block includes image data from the image signal for defining a respective portion of the image signal;

means for transforming a respective image block to obtain a corresponding transform coefficient block that includes a corresponding set of transform coefficients, the corresponding transform coefficients being usable for reconstructing a portion of the image signal;

means responsive to a predetermined visibility measure for generating an ordered block of image transform coefficients;

means for providing the ordered block of transform coefficients to a communications medium as a segment of predetermined size;

means for retrieving at least a snatch from an ordered block of transform coefficients from the communications medium; and means for reconstructing a partial image signal from the snatch of retrieved transform coefficients.

14. The system of claim 13 wherein the generating means comprises:

means for rank ordering the transform coefficients of a transform coefficient block from a highest visibility measure to a lowest visibility measure.

15. The system of claim 13 further comprising:
means for recording the ordered block of transform coefficients on a magnetic medium as a segment of predetermined size.

16. The system of claim 13 further comprising:
means for transmitting the ordered block of transform coefficients on a communications medium as a segment of predetermined size.

17. The system of claim 13 wherein the transforming means comprises:
means for transforming each respective image block using a discrete cosine transformation methodology.

18. The system of claim 17 wherein the generating means comprises:
means for multiplexing a plurality of the dct transform coefficient blocks and
means for rank ordering the dct transform coefficients of a dct transform coefficient block according to a visibility ordering measure.

19. The system of claim 18 wherein the rank ordering means comprises:
means for rank ordering the transform coefficients of a transform coefficient block from a highest visibility measure to a lowest visibility measure.

20. The system of claim 19 wherein the rank ordering means further comprises:
means for rank ordering the transform coefficients of a transform coefficient block from a highest visibility measure, which corresponds to a lowest frequency component, to a lowest visibility measure, which corresponds to a highest frequency component.

21. A method for compressing a digital image signal and for decompressing the compressed digital image signal, the method comprising the steps of:
(a) receiving the image signal;
(b) transforming a plurality of image blocks into a plurality of coefficient blocks, each image block representing a portion of the image and each coefficient block including transform coefficients which are usable to reconstruct the portion of the image represented by the image block;
(c) generating a data set of coefficient blocks;
(d) selecting an i-th transform coefficient from a corresponding i-th position in each coefficient block in the data set;
(e) generating an i-th group of transform coefficients, each transform coefficient in the i-th group of transform coefficients comprising the transform coefficient situated at the i-th position in each coefficient block in the data set;
(f) repeating steps (d) and (e) for each transform coefficient in each coefficient block comprising the data set of coefficient blocks;
(g) rank ordering the respective groups of transform coefficients by applying a visibility measure to each group of selected transform coefficients;
(h) retrieving a snatch from an ordered block of transform coefficients; and
(i) reconstructing a partial image signal from the snatch of retrieved transform coefficients.

22. The method for compressing a digital image signal as defined in claim 21 further comprising the step of:
recording each group of visibility ordered transform coefficients on a magnetic tape medium.

23. The method for compressing a digital image signal as defined in claim 21 further comprising the step of:
quantizing each group of visibility ordered transform coefficients;
Huffman coding the quantized transform coefficients; and
recording each group of visibility ordered transform coefficients on a magnetic tape medium.

24. The method for compressing a digital image signal as defined in claim 21 further comprising the step of:
transmitting each group of visibility ordered transform coefficients to a receiver.

25. A system for compressing a digital image signal and for decompressing the compressed digital image signal comprising:
means for receiving the image signal;
means for transforming a plurality of image blocks into a plurality of coefficient blocks, each image block representing a portion of the image and each coefficient block including transform coefficients which are usable to reconstruct the portion of the image represented by the image block;
means for generating a data set of coefficient blocks;
means for iteratively generating each group of transform coefficients, each transform coefficient in a group of transform coefficients comprising the transform coefficient situated at a respective position in each coefficient block in the data set;
means for rank ordering the respective groups of transform coefficients by applying a visibility measure to each group of selected transform coefficients;
means for retrieving a snatch from an ordered block of transform coefficients; and
means for reconstructing a partial image signal from the snatch of retrieved transform coefficients.

26. The compression system defined in claim 25 further comprising:
means for recording each group of visibility ordered transform coefficients on a magnetic tape medium.

27. The compression system defined in claim 25 further comprising:
means for transmitting each group of visibility ordered transform coefficients to a receiver.

28. A method for reconstructing a partial digital image signal, the method comprising the steps of:
retrieving a snatch of transform coefficients,
the snatch including one or more rank ordered groups of transform coefficients, each group of transform coefficients comprising a plurality of similarly significant transform coefficients, the plurality of similarly significant transform coefficients comprising one similarly significant transform coefficient from each of the plurality of transform coefficient blocks that comprises a data set of coefficient blocks, the group having been rank ordered among a plurality of groups of different similarly significant transform coefficients, the rank ordering being in response to a visibility measure having been applied to the transform coefficients of a transform coefficient block and each transform coefficient block including transform coefficients which are usable to reconstruct a portion of the image represented by an image block corresponding to the inverse transform of the transform coefficient block;

generating a plurality of coefficient blocks equal to the size of the data set;
providing each of the plurality of coefficient blocks with respective and corresponding transform coefficients from the retrieved snatch;
inversely transforming the plurality of generated coefficient blocks to obtain a corresponding plurality of image blocks;
each image block representing a portion of the image and;
generating a reconstruction of the partial image from the plurality of image blocks.

29. A system for reconstructing a partial digital image signal, the system comprising:
means for retrieving a snatch of transform coefficients, the snatch including one or more rank ordered groups of transform coefficients, each group of transform coefficients comprising a plurality of similarly significant transform coefficients, the plurality of similarly significant transform coefficients comprising one similarly significant transform coefficient from each of the plurality of transform coefficient blocks that comprises a data set of coefficient blocks, the group having been rank ordered among a plurality of groups of different similarly significant transform coefficients, the rank ordering being in response to a visibility measure having been applied to the transform coefficients of a transform coefficient block and each transform coefficient block including transform coefficients which are usable to reconstruct a portion of the image represented by an image block corresponding to the inverse transform of the transform coefficient block;
means for generating a plurality of coefficient blocks equal to the size of the data set;
means for providing each of the plurality of coefficient blocks with respective and corresponding transform coefficients from the retrieved snatch;
means for inversely transforming the plurality of generated coefficient blocks to obtain a corresponding plurality of image blocks; each image block representing a portion of the image and;
means for generating a partial reconstruction of the image from the plurality of image blocks.

30. A method for locating an image that is stored as an image signal on a magnetic tape medium, the method comprising the steps of:
retrieving a first snatch of information from the magnetic tape,
recovering a rank ordered group of transform coefficients from the first snatch of retrieved information, the group of transform coefficients comprising a transform coefficient from each of a plurality of transform coefficient blocks comprising the data set, each transform coefficient of a transform coefficient block having had applied thereto a visibility measure;
inversely transforming the retrieved first snatch of transform coefficients;
generating a plurality of image blocks from the inversely transformed first snatch of retrieved transform coefficients, each image block representing a portion of a retrieved image and each image block including a plurality of image pixels which are usable to reconstruct the portion of the image represented by the image block;
generating a partial image during the reconstruction of the retrieved image from the plurality of image blocks comprising the first snatch of information; and
comparing the retrieved image with the image to be located on the tape.

31. The method defined in claim 30 for locating an image that is stored as an image signal on a magnetic tape medium, the method further comprising the steps of:
retrieving a second snatch of information from the magnetic tape; and
repeating on the second snatch of information those same steps that were performed on the first snatch.

32. The method defined in claim 31 for locating an image that is stored as an image signal on a magnetic tape medium, the method further comprising the steps of:
repeating the retrieving of such additional number of snatches snatch of information from the magnetic tape; and
repeating on each retrieved snatch those same steps that were performed on the second snatch until the comparing step show a match between the retrieved image and the image to be located on the tape whereupon the image to be located on the magnetic tape is deemed to have been located.

33. A system for locating an image that is recoverable from a communications medium as an image signal on the communications medium, the system comprising:
means for retrieving a first snatch of information from the communications medium,
means for recovering a rank ordered group of transform coefficients from the first snatch of retrieved information, the group of transform coefficients comprising a transform coefficient from each of a plurality of transform coefficient blocks comprising the data set, each transform coefficient of a transform coefficient block having had applied thereto a visibility measure;
means for inversely transforming the retrieved first snatch of transform coefficients;
means for generating a plurality of image blocks from the inversely transformed first snatch of retrieved transform coefficients;
means for generating a partial image from the reconstruction of the retrieved image from the plurality of image blocks comprising the first snatch of information; and
means for comparing the retrieved image with the image to be located on the communications medium.

34. The image locating system defined in claim 33 further comprising repeating means, the repeating means including:
retrieving means for retrieving at least a second snatch of information from the communications medium; and
iteratively generating means for repeating on the second snatch of information those same functions that were performed on the first snatch by the image block generating means and the partial reconstruction generating means.

35. The image locating system defined in claim 34 wherein the communications medium is a magnetic tape and wherein the repeating means further comprises:

means for iteratively retrieving additional numbers of snatches of information from the communications medium; and means for repeating on each retrieved snatch those same functions that were performed on the second snatch until the comparing means shows a match between the retrieved image and the image to be located on the magnetic tape whereupon the image to be located on the magnetic tape is deemed to have been located.

36. The image locating system defined in claim 34 wherein the communications medium is a communication channel and wherein the repeating means further comprises:

means for iteratively retrieving additional numbers of snatches of information from the communications medium; and means for repeating on each retrieved snatch those same functions that were performed on the second snatch until the comparing means shows a match between the retrieved image and the image to be located on the communications channel whereupon the image to be located on the communication channel is deemed to have been located.

* * * * *